US008167700B2

(12) United States Patent
Fujimoto

(10) Patent No.: US 8,167,700 B2
(45) Date of Patent: May 1, 2012

(54) GAMING DEVICE

(75) Inventor: Jun Fujimoto, Koto-ku (JP)

(73) Assignee: Universal Entertainment Corporation, Tokyo (JP)

( * ) Notice: Subject to any disclaimer, the term of this patent is extended or adjusted under 35 U.S.C. 154(b) by 440 days.

(21) Appl. No.: 12/415,294

(22) Filed: Mar. 31, 2009

(65) Prior Publication Data

US 2009/0264196 A1 Oct. 22, 2009

(30) Foreign Application Priority Data

Apr. 16, 2008 (JP) ................................ 2008-107256
Apr. 16, 2008 (JP) ................................ 2008-107257

(51) Int. Cl.
*A63F 9/24* (2006.01)
*G06F 17/00* (2006.01)

(52) U.S. Cl. ................ 463/16; 463/21; 463/31; 463/37; 463/42

(58) Field of Classification Search .............. 463/16–21, 463/31, 37, 42
See application file for complete search history.

(56) References Cited

U.S. PATENT DOCUMENTS

2005/0245302 A1 11/2005 Bathiche et al.
2008/0076506 A1* 3/2008 Nguyen et al. .................. 463/16
2008/0090645 A1* 4/2008 Walker et al. ................... 463/25
2008/0108429 A1* 5/2008 Davis et al. ..................... 463/26
2009/0061974 A1* 3/2009 Lutnick et al. .................. 463/13
2009/0124379 A1* 5/2009 Wells ............................. 463/31

FOREIGN PATENT DOCUMENTS

JP 2005-317032 11/2005

* cited by examiner

*Primary Examiner* — Hsien Ming Lee
(74) *Attorney, Agent, or Firm* — Edwards Wildman Palmer LLP

(57) ABSTRACT

A gaming device includes a plurality of stations which can be played by respective ones of a plurality of player. A detection section detects a motion of the player at the respective one of the stations. A controller communicates with the plurality of stations. This gaming device includes processes of: (i) receiving acceptance information of a game from the plurality of stations; (ii) causing the display section to display the BET image corresponding to the respective one of the stations; (iii) causing the detection section to detect a motion of the player when a gaming medium is BET-operated on the BET image displayed at the display section; (iv) causing the image acquisition section to acquire an image of the player who is present at the respective one of the stations and to image-process the acquired image information; (v) judging whether or not the notification section performs notification based upon a result of the detection of the motion of the player and a result of the image processing of the image acquisition; and (vi) causing the notification section to perform notification in accordance to a result of the judging result.

9 Claims, 18 Drawing Sheets

GAMING DEVICE

CROSS-REFERENCE TO RELATED APPLICATIONS

This application is based upon and claims a priority from the prior Japanese Patent Application Nos. 2008-107256 and 2008-107257 filed on Apr. 16, 2008, the entire contents of which are incorporated herein by reference.

BACKGROUND OF THE INVENTION

1. Field of the Invention

The present invention relates to a gaming device including an image display section and a plurality of gaming stations which are installed for players and which are participable in a game executed at the image display section.

2. Description of the Related Art

In general, a variety of gaming devices are installed in gaming facilities or casinos. As one of such gaming devices, a configuration is known which includes an image display portion and a plurality of gaming stations (hereinafter, referred to as stations) which are installed for players and executed at the image display section.

Such a gaming device includes: an image display section at which a game is to be executed; and a plurality of stations which are installed around the image display section, where players participate in a game which is executed at the image display section. At a respective one of the stations, there are installed: a gaming medium processing section for processing (mainly, entering and paying out) gaming mediums employed upon execution of a game, such as coins or medals; and a BET operation section for making BET operation for the game that is executed at the image display section.

A configuration disclosed in Japanese Laid-open Patent Application No. 2005-317032, for example, is known as the abovementioned gaming device which is capable of performing games. This gaming machine includes a table-type cabinet, and is capable of projecting a gaming image and a variety of required images associated with gaming (such as an image for BET operation, for example) by means of a projector which is installed inside of the cabinet, onto an image display section (display) installed in a horizontal state. Further, inside of this cabinet, a detection section is installed which includes: a light source which irradiates infrared light toward the image display section so as to detect a variety of operations (such as BET operation) for a player to executed at the image display section; and a camera which receives reflection light reflected from the player's fingers irradiated from the light source and moving upwardly of the image display section.

In the conventional gaming device thus configured, a player can participate in a game executed at the image display section installed on a surface of the cabinet by making a variety of operations on the image display section, for example, by motion of a finger.

Incidentally, in the conventional gaming device configured above, a person who conducts and monitors a game, such as a dealer, may be absent, or even if such a dealer or person who monitors a game is present, it is difficult to check operation of all of the players. Thus, the management side of the gaming facility can visually keep track of what is going on in the game, and even if incorrect action (operation mistake) or illegal act is taken in the game, it is difficult to recognize such event.

The conventional gaming device is configured so that: a comparison process is performed between a predetermined position (for example, BET operation position) for an image actually projected and an operation position actually detected by the detection section; and, when it is detected that a player has actually made an operation of placing one's finger in a predetermined position, a specific process (such as BET acceptance process) specified at the predetermined position is executed. In this manner, the player can actually perform a game by making a variety of operations on the image display section in the game that is executed at the image display section.

However, if a BET is not placed in a predetermined BET position or if a BET exceeding a specified amount is placed in the BET position, a player cannot make correct BET operation on the image display section. In such a case, invalidating the game is a hard thing for a player, degrading the player's reliability relative to the gaming device.

The present invention has been made in view of the above-described problem, and provides a highly reliable gaming device which is capable of visually keeping track of what is going on in a game and incorrect action (operation mistake)/illegal act in the game under a gaming environment in which a person monitoring a game is substantially absent; and which is capable of saving a player's incorrect BET operation.

SUMMARY OF THE INVENTION

A first aspect of the present invention is directed to a gaming device, including: (a) a plurality of stations which can be played by respective ones of a plurality of players; (b) a display section which displays an image for a game and a BET image corresponding to a respective one of the stations; (c) a detection section which detects a motion of the player when the player who is present at a respective one of the stations makes a BET operation for the BET image displayed at the display section; (d) an image acquisition section which is capable of acquiring an image of the player who is present at the respective one of the stations; (e) a notification section which performs notification, based upon a predetermined condition; and (f) a controller which can be communicated with the plurality of stations, the controller being configured to: (i) receive acceptance information of a game from the plurality of stations; (ii) cause the display section to display the BET image corresponding to the respective one of the stations; (iii) cause the detection section to detect a motion of the player when a gaming medium is BET-operated on the BET image displayed at the display section; (iv) cause the image acquisition section to acquire an image of the player who is present at the respective one of the stations and to image-process the acquired image information; (v) judge whether or not the notification section performs notification based upon a detection result of (iii) and an image processing result of (iv); and (vi) cause the notification section to perform notification in accordance with a judgment result of the process (v).

According to the first aspect of the present invention, a notification section is provided which performs notification based upon a detection result of a detection section and a result of image-process image information acquired by an image acquisition section. Thus, a state of a game played by a player at a respective one of stations can be monitored by means of the detection section and the image acquisition section and can be notified by means of the notification section in accordance with a result of the monitoring. In this manner, for example, under a game-playing environment that a person who monitors a game does not substantially exist, a game-playing state and incorrect action (operation mistake)/illegal act in the game can be grasped and the player's mistaken BET operation can be saved.

A second aspect of the present invention is directed to a gaming device, including: (a) a cabinet having stations which can be played by a plurality of players and are installed by the players; (b) an image display section which is provided at the cabinet and displays an image for a game and a BET image corresponding to a respective one of the individual stations; (c) an image control section having image data for the game displayed at the image display section and image data for BET operation, for controlling the image displayed at the image display section; (d) a motion detection section which detects a motion when the player who is present at a respective one of the stations makes BET operation for the BET image displayed at the image display section; (e) an image acquisition section which is installed at the cabinet and is capable of acquiring an image of the player who is present at the respective one of the stations; (f) a player detection section which detects whether the player at the respective one of the stations is present, based upon a video image acquired by the image acquisition section; (g) an input operation detecting section which detects an operational input for a game played at the respective one of the stations; and (h) a notification section which notifies detection when the operational input of the game at the station is detected by the input operation detecting section, at the station at which it is detected that no player is present by the player detection section.

According to the second aspect of the present invention, in a case where the presence or absence of a player can be verified by means of a live image of a station using an image acquisition section and an operational input is detected at a station where no player is present, the fact can be notified. In other words, a mysterious phenomenon that an operational input is detected in spite of the absence of a player can be recognized and notified as an illegal act or an incorrect action (operation mistake). Thus, even under an unattended game-playing environment that a person who monitor s game does not exist, or alternatively, even under a game-playing environment that it is difficult to check operation of all of the players in the presence of a dealer or a person who monitors a game, a game-playing state and an incorrect action (operation mistake)/illegal act in the game can be grasped visually, reliably, and precisely.

A third aspect of the present invention is directed to the gaming device according to the second aspect, wherein: the notification section vocally notifies the detection.

According to the third aspect of the present invention, acoustic notification can be performed and an abnormal game-playing operation can be reliably recognized.

A fourth aspect of the present invention is directed to the gaming device according to the second aspect, wherein: the notification section notifies the detection by way of visual display.

According to the fourth aspect, acoustic notification can be performed, and an abnormal game-playing operation can be reliably recognized.

A fifth aspect of the present invention is directed to a gaming device, including: (a) a cabinet having stations which can be played by a plurality of players and which is installed by the players; (b) an image display section which is provided at the cabinet and which displays an image for a game and a BET image corresponding to a respective one of the stations; (c) an image control section having image data for the game displayed at the image display section and image data for BET operation, for controlling the image displayed at the image display section; (d) a motion detection section which detects a motion when the player who is present at a respective one of the stations makes BET operation for the BET image displayed at the image display section; (e) an image acquisition section which is installed at the cabinet and is capable of acquiring an image of the player who is present at the respective one of the stations; (f) an operation mistake detecting section which detects a mistaken BET operation by a player, based upon the visual image acquired by the image acquisition section; and (g) a notification section which notifies detection when the mistaken BET operation is detected by the operation mistake detecting section.

According to the fifth aspect of the present invention, an mistaken ET operation by a player is detected, based upon an image derived from an image acquisition section which image-acquires a player, thus making it possible to detect the operation mistake visually, reliably, and effectively. Further, the fact can be notified based upon detection of the operation mistake, thus allowing the player to be given an opportunity of correcting the incorrect BET operation, which becomes very beneficial to the player. This leads to enhancing the player's reliability relative to the gaming device.

A sixth aspect of the present invention is directed to the gaming device according to the fifth aspect, wherein: the BET image includes a gaming medium to be betted and a BET position at which the gaming medium is to be betted; and the mistaken BET operation is an operation in which no gaming medium is betted at the BET position.

According to the sixth aspect of the present invention, the advantageous effect similar to that of the gaming device according to the fifth aspect can be attained, and a typical operation mistake that no gaming medium is betted at the BET position can be detected and notified. Therefore, the player can be given an opportunity of correcting such operation mistake.

A seventh aspect of the present invention is directed to the gaming device according to the fifth aspect, wherein: the BET image includes a gaming medium to be betted and a BET position at which the gaming medium is to be betted; and the mistaken BET operation is an operation in which a gaming medium, an amount of which exceeds a specified value, is betted at the BET position.

According to the seventh aspect of the present invention, the working and/or advantageous effect similar to those (that) of the gaming device according to the fifth aspect can be attained, and a typical operation mistake that no gaming medium is betted at the BET position can be detected and notified. Therefore, the player can be given an opportunity of correcting such operation mistake.

An eighth aspect of the present invention is directed to the gaming device according to the fifth aspect, further including an automatic correction section for automatically correcting the mistaken BET operation by the player.

According to the eighth aspect of the present invention, the working and/or advantageous effect similar to those (that) of the gaming device according to the fifth aspect can be attained, and a mistaken BET operation by a player is automatically corrected, thus making it possible to eliminate retrying the player operation, which is beneficial to the player.

A ninth aspect of the present invention is directed to the gaming device according to the fifth aspect, further including an option providing section which provides to a player an option for correcting the mistaken BET operation by the player.

According to the ninth aspect of the present invention, the working and/or advantageous effect similar to those (that) of the gaming device according to the fifth aspect can be attained, and a player can be given an option for correcting a mistaken BET operation, thus making it possible to cope with a variety of operation mistakes.

According to the present invention, under a game-playing environment that a person who monitors a game is substantially present, a game-playing state and an incorrect action (operation mistake)/illegal act in the game can be visually grasped. Further, the present invention can provide a reliable gaming device which can save a mistaken BET operation of a player.

BRIEF DESCRIPTION OF THE DRAWINGS

FIGS. 3A and 3B are views each showing a layout position of an image acquisition section in the gaming device according to the first embodiment, wherein FIG. 3A is a view showing a state in which the image acquisition section is set at a neutral position, and FIG. 3B is a view showing a modification of the layout position of the image acquisition section;

DESCRIPTION OF THE PREFERRED EMBODIMENTS

Figure 1:
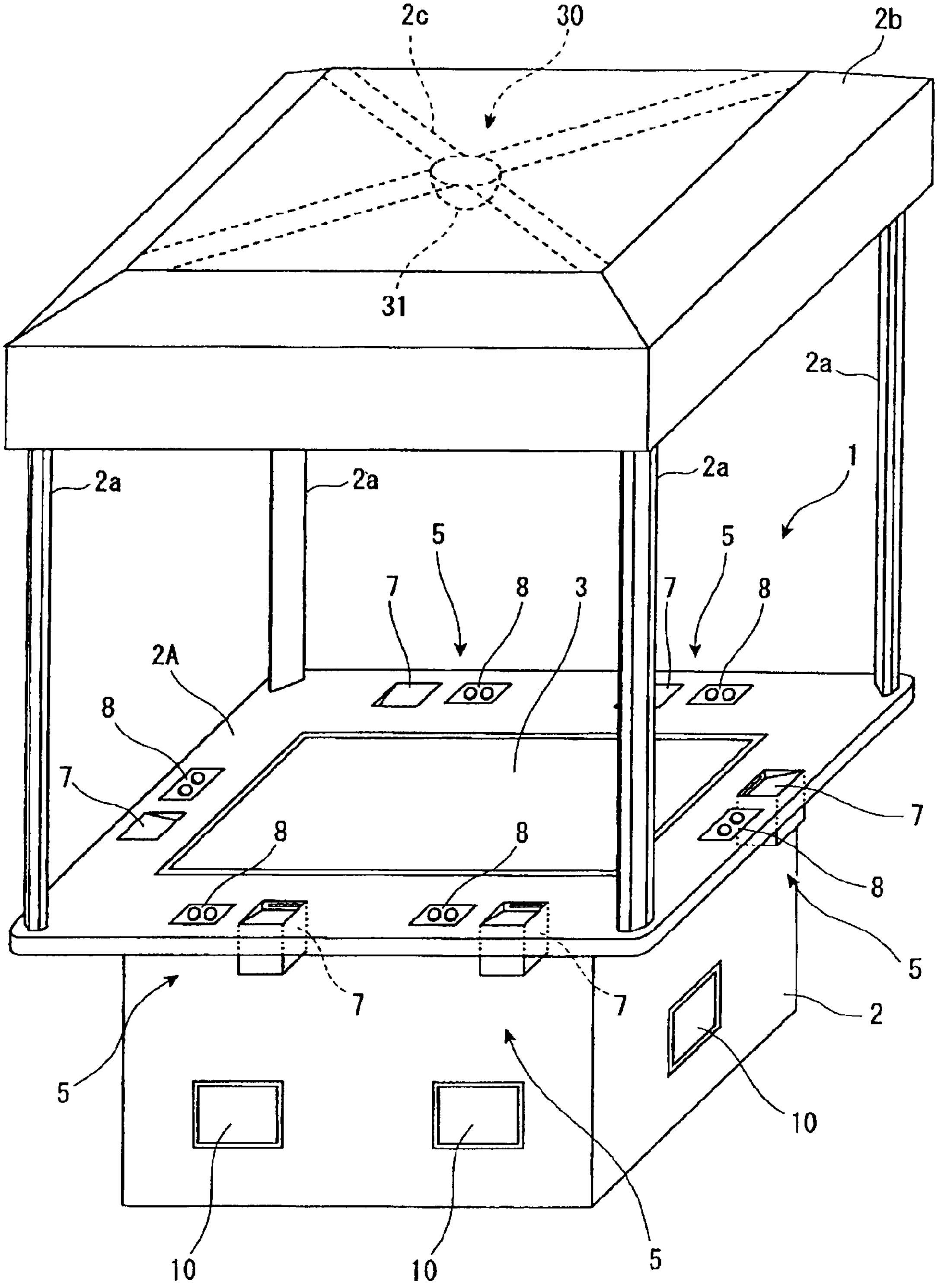
FIG. 1 is a perspective view showing an entire configuration in a gaming device according to a first embodiment.

Hereinafter, embodiments of a gaming device according to the present invention will be described referring to the drawings.

1. First Embodiment

Figure 2:
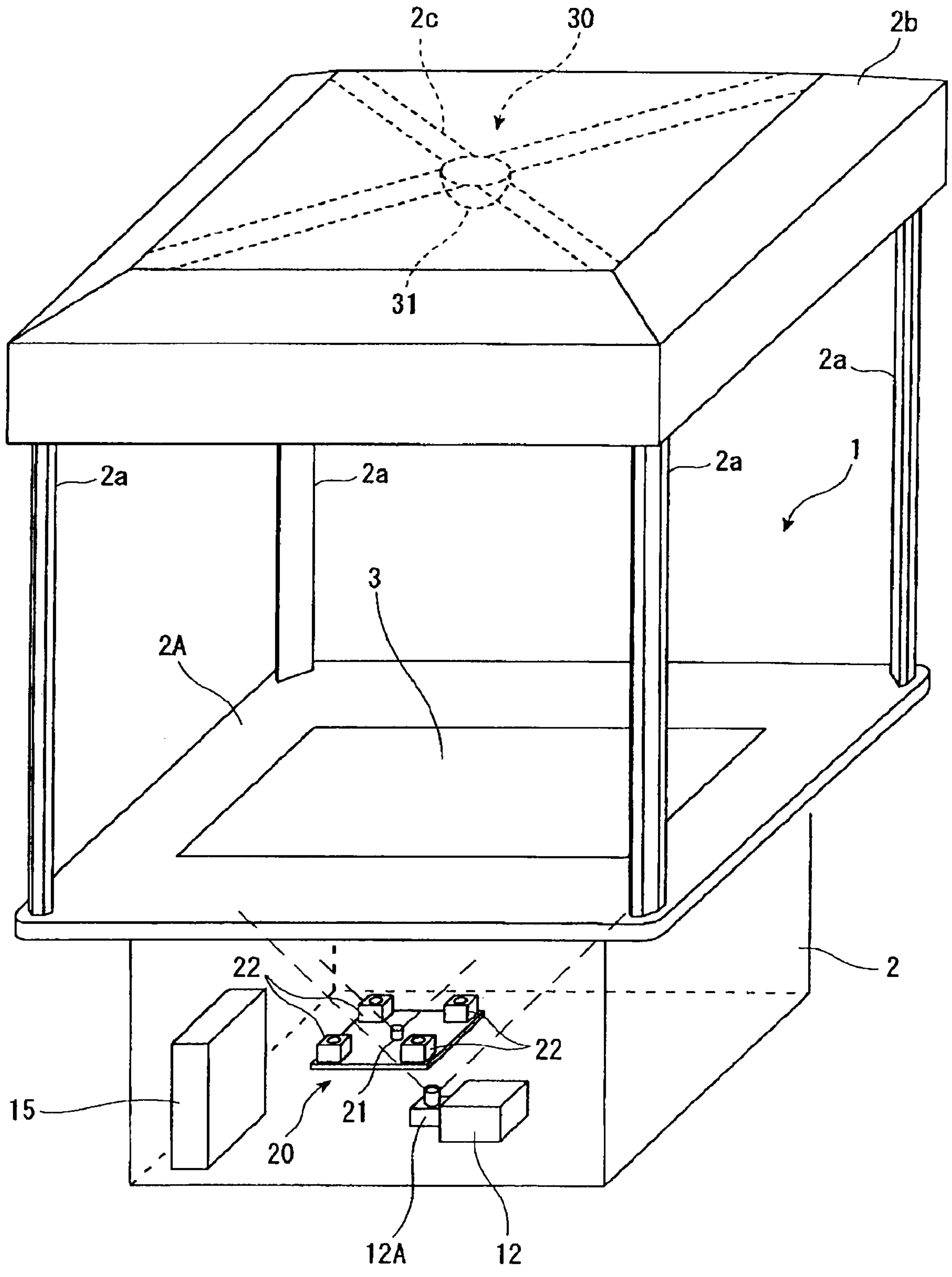
FIG. 2 is a schematic view showing an internal configuration in the gaming device according to the first embodiment.
Figure 3:
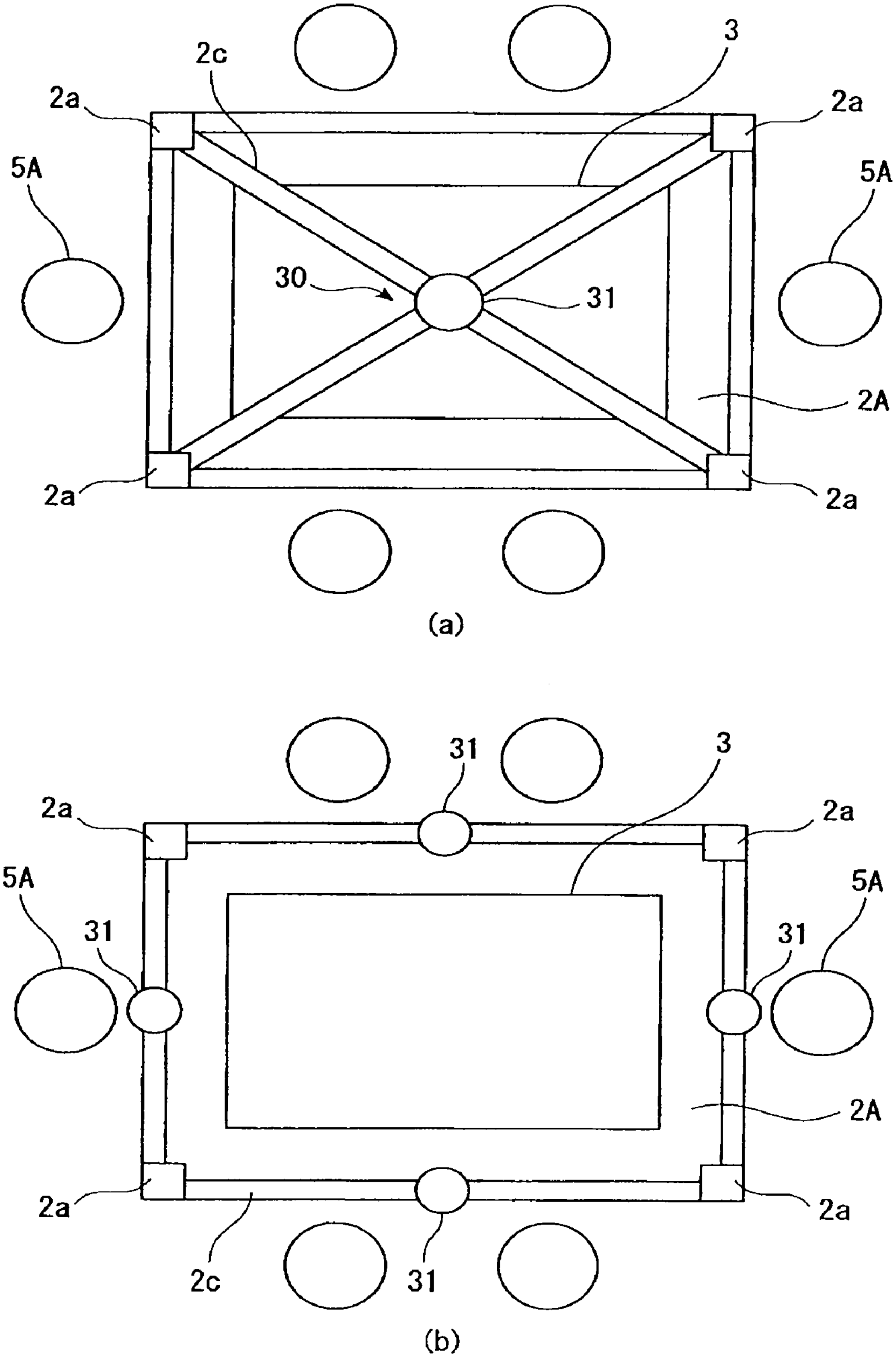
Figure 4:
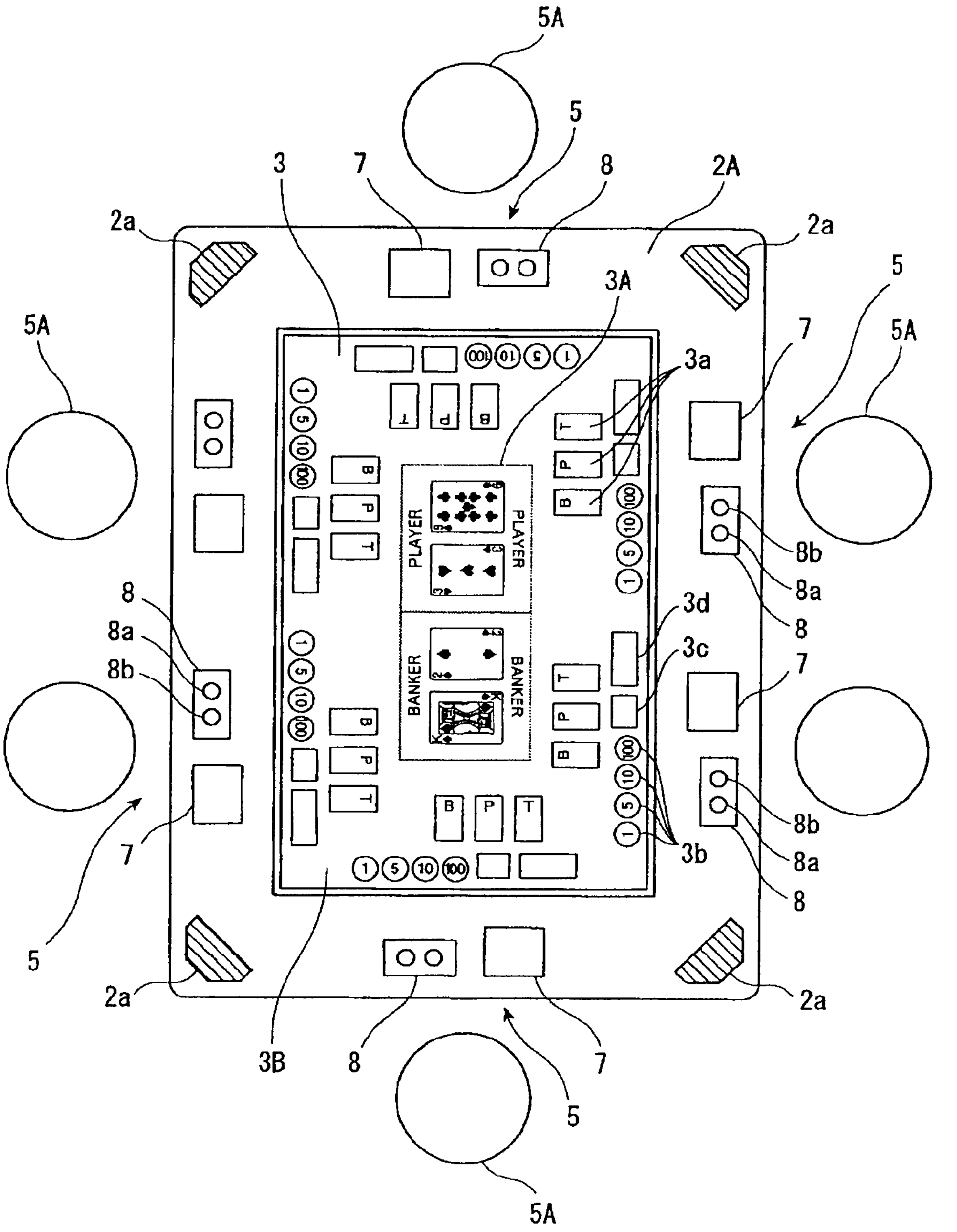
FIG. 4 is a view showing an exemplary game performed at an image display section in the gaming device according to the first embodiment.

A gaming device according to a first embodiment will be described referring to FIGS. 1 to 10. FIG. 1 is a perspective view showing an entire configuration in a gaming device according to a first embodiment; FIG. 2 is a schematic view showing an internal configuration in the gaming device according to the first embodiment; and FIGS. 3A and 3B are views each showing a layout position of an image acquisition section in the gaming device according to the first embodiment, wherein FIG. 3A is a view showing a state in which the image acquisition section is set at a neutral position, and FIG. 3B is a view showing a modification of the layout position of the image acquisition section. Further, FIG. 4 is a view showing an exemplary game performed at an image display section in the gaming device according to the first embodiment.

A gaming device 1 of the embodiment is configured so that: an image display section 3 is installed on a top face of a table-type cabinet 2 (table 2A) and; six stations 5 are installed. A chair 5A is placed at a respective one of the stations 5, and a player sitting at a respective one of the stations 5 can participate in a variety of games such as a card game, a roulette game, and a dice game, for example, which are performed at the center of an image display section 3. At this time, the player can participate in the game performed at the center of a screen by utilizing gaming mediums having gaming values, such as medals, coins, bills, and prepaid cards, and receive payout when the game terminates.

Games are conducted by means of a control unit installed inside of the cabinet 2 and an image projection section or the like controlled by the control unit, as described later. In addition to conducting the games, this control unit performs a variety of processes such as a progress of BET operation of the player at a respective one of the stations and a process of paying out gaming values in accordance with the contents of BET to a player if the player has obtained a winning prize as a result of the game.

A respective one of the stations 5 may be configured so that the player can participate in the game and make BET operation, and is provided with at least: a gaming medium acceptance unit 7 adapted to enter gaming mediums when a game is performed; and a control section 8 made of a plurality of control buttons or the like for the player to enter predetermined instructions. Although the control section 8 is installed at a table portion of the cabinet 2, as illustrated, the functions generated by operating the control buttons may be achieved by an operational image displayed at the image display section 3, or conversely, part of the operation at the image display section may be performed by means of the control buttons.

In the embodiment, as shown in FIG. 4, a baccarat game which is a kind of card games is performed in an image of the image display section 3. In other words, a game area 3A, in which the banker's and player's cards are to be displayed, is provided in a neutral area of the image display section 3, and further, in the peripheral area of the image display section 3, an operational area 3B in which a BET operation can be performed in a game executed in the game area 3A is provided for a respective one of the stations 5.

The operational area 3B is one of the constituent elements of a respective one of the stations 5. In this operational area, a screen such as a BET-operation screen or a help information screen is displayed on a station-by-station basis. In FIG. 4, there is shown a state in which a BET operation screen is displayed at a respective one of the stations 5. This BET operation screen is provided with: a BET area 3*a* for a player to place a bet on "BANKER", "PLAYER", or "DRAW"; a chip display area 3*b* for displaying chips; a determination operation area 3*c* for determining BET; and a credit information display area 3*d* for displaying remaining-credit information.

In this case, a player can perform BET operation by finger-pressing the amount to be chipped from among "1", "5", "10", and "100" displayed in the chip display area 3*b*, following by shifting it to any one of the "BANKER", "PLAYER", and "DRAW" display areas as the BET areas 3*a*, or alternatively, by finger-pressing any one of the "BANKER", "PLAYER", and "DRAW" display areas as the BET areas 3*a* as is. After that, the BET operation is determined by finger-pressing a determination operation area 3*c*. As to such a player's BET operation, a specific indication position is specified by means of a sensor unit 20 which is installed inside of the cabinet 2.

After one game has terminated, the control unit causes the credit responsive to the number of betted chips to be added to the currently player-owned credit, based upon a payment table, and the credit after added to be displayed on a credit information display area 3*d*.

The gaming medium acceptance unit 7 is adapted to insert gaming mediums having gaming values such as medals, coins, bills, and prepaid cards, and is installed at a respective one of the stations 5. The player can execute a game in the range of the entered gaming mediums, and the entered amount thereof is displayed in the credit information display area 3*d*.

The control section 8 is installed at a respective one of the stations 5, and is provided with buttons to be pressed by the player with the progress of a game. These buttons include: a CASHOUT button 8*a*, which is to be pressed when a game has terminated; and a HELP button 8*b*.

The CASHOUT button 8*a* is generally depressed when a game has terminated. When this button is depressed, the gaming mediums according to the currently player-owned credit acquired by the game or the like are cashed out from a payout opening 10 which is provided at a side face of the cabinet 2. In the case of entry and payout of gaming mediums employing cards, value information is rewritten by means of a reader/writer that is installed inside of a gaming medium acceptance unit 7, and the rewritten information is output as it is.

The HELP button 8*b* is depressed when a game operation method or the like is not identified. Immediately after this button has been depressed, a help screen indicating rules or a variety of operation information is displayed on an operational area 3B.

The image display section 3 is made up of a permeable member (permeable screen) so as to display light irradiated from a back face, specifically, a game image projected from an image projection section 12 which is installed inside of the cabinet 2 (card image as shown in FIG. 4), or alternatively, an operational image (such as BET image as shown in FIG. 4). In this case, the image projection section 12 is made up of a publicly known projector, which serves to magnify a variety of images (motion images and still images) transmitted from a control unit 15 which controls the player operation at a respective one of the stations by means of an image forming portion 12A including a magnification lens or the like, followed by forming the magnified image at the image display section 3.

The control unit 15 serves as: an image control section which controls image data for the game that is displayed at the image display section 3; and a play control section which controls the progress of the game together with a variety of images which is displayed at the image display section 3. This control unit 15 may be constituted as an exclusive unit which is installed in advance inside of the cabinet 2, or alternatively, may be constituted such that a unit such as a personal computer (PC) storing data pertinent to a game playing procedure or a variety of image data is incorporated in the cabinet 2. Further, this control unit 15 may be configured to receive/transmit a variety of information from/to an external device such as a host computer, which is installed in a gaming facility, or another gaming device, for example, via a communication network such as the Internet or a LAN.

Further, inside of the cabinet 2, a sensor unit 20 is installed which specifically detects an operation performed by the player sitting at a respective one of the stations, in conducting a card game (a position indicated by the player's finger in the embodiment).

The sensor unit 20 serves as an operation detection section, and has: a light emitting section 21 which emits scanning light to the image display section 3; and four photo-receptor sections (photo-receptor cameras 22) which are installed on a diagonal line around the light emitting section 21. Further, this sensor unit is configured to emit an infrared ray so that it is not influenced by the peripheral visible light that is emitted from the light emitting section 21. Further, the reflected light from an object operated by the player on a surface of the image display section 3 is sensed by means of the photo-receptor camera 22, a change of light quantity associated with the player's finger operation is sensed, and the sense signal is processed, whereby the specific operation position of a respective one of the players can be specified.

By installing a plurality of the photo-receptor camera 22 (four cameras), even if a plurality of players make operations simultaneously, the multi-point operation position can be precisely specified, based upon angle information of an object (finger) which is sensed by a respective one of the cameras. In other words, angle information of an object can be computed through the four cameras 22 and items of the angle information derived from a respective one of the cameras can be combined with each other by means of a predetermined algorithm, thus making it possible to precisely specify the multi-point operated operation positions.

Further, at the cabinet 2, an image acquisition section 30 is installed which acquires the image displayed at the image display section 3 and an image of the player sitting at the chair 5A. This image acquisition section 30 is made up of a CCD camera, for example. The acquired image data is converted into electrical signals, and the converted signals are compared with a reference image, with respect to the presence of a player, a player's operation state (including an operation position), and a display state of the image display section. The resultant signals are utilized for a variety of processes such as verification process or correlation process, for example.

In the embodiment, a vertical support member 2*a* is fixed at corners of the table 2A of the cabinet 2, and a decorative tabletop 2*b*, which is substantially parallel to the table 2A, is provided at an upper end of the vertical support member 2*a*. Further, a frame 2*c* is placed in this tabletop 2*b*, and a CCD camera 31 constituting an image acquisition section is arranged. Specifically, the frame 2*c* that is installed in the tabletop 2*b* is laterally placed on a diagonal line, as shown in FIG. 3A, and the CCD camera 31 is installed upwardly of a position corresponding to the vicinity of the center of the image display section 3.

The CCD camera 31 is constituted as a so called dome camera which is accommodated in a dome-type housing fixed to the frame 2*c*, for example. This camera is capable of periodically acquiring an image in a predetermined direction (a respective one of the stations 5 and image display section 3) by means of mechanisms such as a rotational mechanism, which is installed therein, and a tilt mechanism. For this reason, the CCD camera 31 is capable of acquiring an image of all of the players sitting at tables 5A as well as the variety of images displayed at the image display section 3.

The configuration, setup location, and image acquisition intervals or the like, of the CCD camera 31, can be appropriately modified depending upon use of the associated images. As shown in FIG. 3B, for example, in a state in which a rectangular frame 2*c* is installed in the tabletop 2*b*, the CCD camera 31 can be arranged in a direction opposite to that of a respective one of the stations 5. As to the CCD camera arranged at the opposite position, as shown in FIG. 3B, one player may be image-acquired by means of one CCD camera or a plurality of players may be image-acquired by one CCD camera. With such a configuration, in addition to the presence of a player sitting at the chair 5A, facial expression of the player can also be image-acquired, thus allowing the acquired image data to be utilized for a face recognition process, for example.

Preferably, the image acquisition section 30 as described above is installed so that it cannot be visually recognized by the player sitting at the chair. For example, a hole adapted to expose only a lens portion is formed on the decorative tabletop 2*b* as mentioned above, and the CCD camera 31 is installed, thereby allowing a required image to be acquired without the player being aware of the camera.

Further, apart from the abovementioned image acquisition section, for example, speakers for piping music or effect sound or a variety of lamps may be installed in the cabinet 2.

Next, a control system of the gaming device 1, which is configured as described above, will be described referring to the block diagrams of FIGS. 5 to 7.

Figure 5:
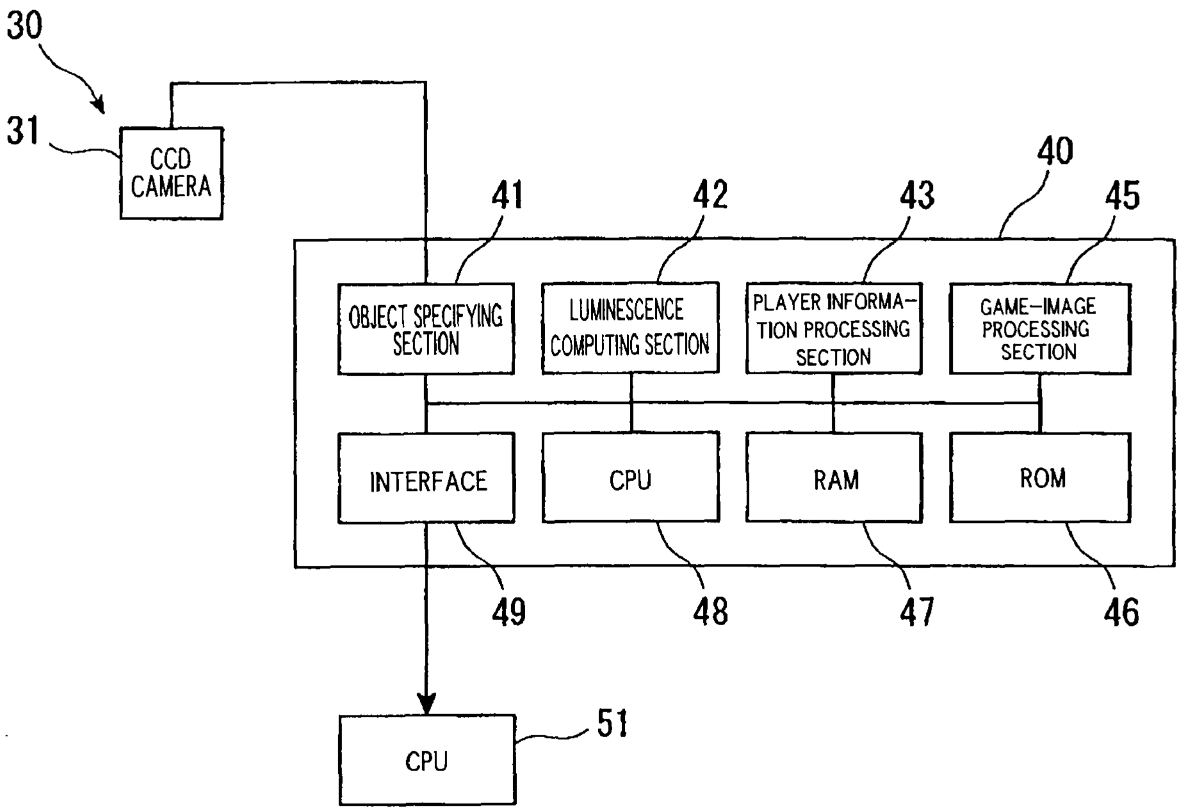
FIG. 5 is a block diagram depicting a schematic configuration of an image processing system which processes an image acquired by the image acquisition section in the gaming device according to the first embodiment.

FIG. 5 is a block diagram depicting a schematic configuration of an image processing system which processes an image acquired at an image acquisition section in the gaming device according to the first embodiment. As described above, the image acquisition section 30 includes: an image display section 3; and a CCD camera (image pickup device) 31 which is capable of imaging a player. The image signal from this CCD camera 31 is processed by means of an image processing circuit (image processing section) 40.

The image processing circuit 40 is provided with: an object specifying section 41 which receives an imaging signal from the CCD camera 31; a luminescence computing section 42 which converts into luminescence information an acquired image for each pixel of an object specified by the object specifying section 41; a player information processing section 43 which processes player information (such as the presence or absence of a player; player operation information; facial information; information on player operation made with an elapse of time) on a station-by-station basis, in accordance with the luminescence information computed by the luminescence computing section 42; a game image processing section 45 which processes information of a game image displayed at the image display section 3 based upon the luminescence information computed by the luminescence computing section 42 (such as the contents of the game image, the contents of a BET image, and positional information thereof (including positional information concerning the player BET operation); a ROM 46 storing operational programs, reference data defined as a comparative reference, or mask data for masking an unnecessary background image; a RAM 47 serving to temporarily store a running program or processed image data, for example; and a CPU 48 controlling them. These units are structured to be interconnected via a bus, a respective one of which is controlled by means of the control CPU 48.

Specifically, as to the image signal acquired by means of the CCD camera 31, the object specifying section 41 specifies image information. For example, the player information processing section 43 acquires edge information, thereby allowing the processing section to process data concerning whether or not a player sits at a chair 5A of a station 5 or data concerning an instructive position manually operated by the player. Further, in accordance with the specified image information, the game image processing section 45 can process data of the game image displayed at the image display section 3 (such as the contents of image(s) displayed, display position, or operation position).

The luminescence computing section 42 can execute a variety of processes by converting the specified image information into data which is inclusive of luminescence information on a pixel-by-pixel basis. For example, the player information processing section 43 detects the continuity of portions at which differences in luminescence information are associated with each other by predetermined thresholds or more, based upon the image that is acquired by predetermined time intervals, thereby acquiring data concerning directivity of an operation of that player. Alternatively, this processing section image-acquires the player's face, and compares the imaged face with a prestored reference image (reference data) by employing a correlation, making it possible to acquire data concerning the identity of a person, for example. For the reference data, if image acquisition is continuously performed, an image which is acquired at one time point may be defined as reference data, or alternatively, an image which is stored in advance in a ROM or an image which is transmitted from another device (such as host computer) may be defined as reference data.

With respect to the image signal that is acquired by means of the CCD camera 31, in a case where an unnecessary background is deleted or where the contents of the display of the image display section 3 cannot be specifically identified, only an image of a table portion and an image of a player, who operates on a table, can be acquired by superimposing the mask data that is stored in the RAM 46. Such image data is transmitted to a CPU 51 for main control, to be described later, and the transmitted data is actually combined with the image data that is displayed at the image display section, thereby making it possible to acquire image data which is obtained by specifying the position of a player which is present at the station 5 and the contents of the display at the image display section 3.

After that, the data concerning the thus obtained processing image is stored in the RAM 47, and the stored data is transmitted to the CPU 51 for main control at a game control section 15A, when a card game described below is performed, via the interface 49.

Figure 6:
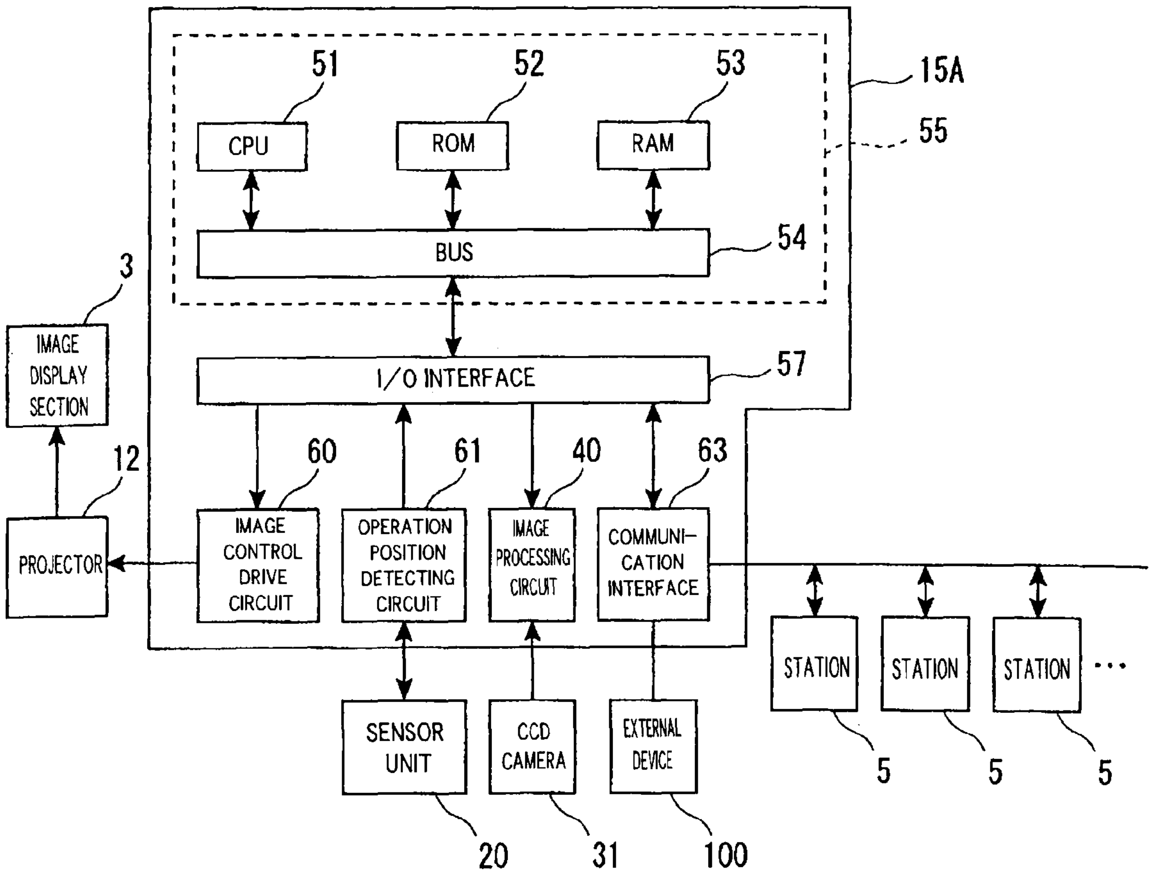
FIG. 6 is a block diagram depicting a configuration of a game control section at a control unit adapted to perform a card game in the gaming device according to the first embodiment.

FIG. 6 is a block diagram depicting a configuration of a game control section at a control unit 15 when a card game is performed in the game device according to the first embodiment.

As shown in FIG. 6, a game control section 15A has a microcomputer 55 which is configured on the basis of the CPU 51 for main control, the ROM 52, the RAM 53, and the bus 54 that is adapted to transfer data therebetween. The CPU 51 is connected, via an I/O interface 57, to the image processing circuit 40 that processes an image of the player sitting at a respective one of the stations 5 and the contents of the display at the image display section 3; an image control drive circuit 60 which controls a variety of images displayed at the image display section 3; and an operation position detecting circuit 61 which receives a sense signal from a sensor unit 20 which senses an operation position of a finger (object) of the player sitting at a respective one of the stations 5, and concretely specifies the operation position of each player.

The CPU 51 for main control, of the game control section 15A, serves to transmit/receive a variety of data, such as BET information or payment information, to/from a respective one of the stations 5 via the I/O interface 57 and a communication interface 63, and thereafter, mainly control a respective one of the stations 5, thereby conducting a game. Specifically, this CPU specifies the information concerning a BET operation made at a respective one of the stations 5 by means of the operation position detecting circuit 61; accepts the BET information; performs a winning prize judgment process of betted chips, based upon the information concerning a BET placed at a respective one of the stations 5; and computes the amount of credit paid out at a respective one of the stations 5, referring to a payment table.

A ROM 52 which is provided at the game control section 15A is made up of a semiconductor memory or the like, for example, and stores a program for achieving basic functions in conducting a baccarat game, a display operation program for controlling the contents of various images which are displayed at the image display section 3, a program for mainly controlling a respective one of the stations 5, a program concerning acceptance or payout of gaming mediums, and a payment table or the like to be referenced in executing a baccarat game.

The RAM 53 is a memory which temporarily stores a variety of data computed by means of the CPU 51. This memory temporarily stores: information on a player's operation using a control section or an operational screen of a respective one of the stations 5 (such as BET operation position or BET amount); station-based operation position information specified by means of an operation position detecting circuit 61; image data which is acquired by means of the CCD camera 31 and processed by means of the image processing circuit 40; and data or the like concerning a result of the process that is executed by means of the CPU 51.

After that, the CPU 51 for main control, of the game control section 15A, executes control processes arising with the progress of a game, such as a process of controlling a variety of drive units and an image which is displayed at the image display section 3, based upon the data or programs that are stored in the ROM 52 and the RAM 53.

The image control drive circuit 60 is made up of constituent elements, such as a program ROM, an image ROM, an image control CPU, a work RAM, a VDP (Video Display Processor), and a video RAM. The program ROM stores programs such as an image control program concerning display of the image display section 3, and the image ROM stores a variety of image data (dot data) for forming an image which is displayed at the image display section 3, for example.

Further, the image control CPU determines an image displayed at the image display section 3 (projector 12) from among items of the dot data stored in the image ROM, in accordance with the image control program stored in advance in the program ROM. This determination is based upon the parameters set in the CPU 51. Therefore, the CPU 51 controls: the game image (card image) as shown in FIG. 4; a specific display position of an operational image (BET image); and a timing of displaying an image concurrently with the progress of a game.

Further, the work RAM is constituted as a temporary storage section, when the image control CPU executes the image control program. The VDP forms an image corresponding to the contents of the display determined by means of the image control CPU. The resultant image is projected on the image display section 3 via a projector 12.

The operation position detecting circuit 61 is provided with a CPU or the like which executes predetermined computational processes, and serves to concretely specify a position of an object (indicated by a player's finger), which is present on a surface of the image display section 3. Specifically, this circuit serves to receive a sense signal from four cameras 22 of a sensor unit 20 installed inside of the cabinet 2 and specify a portion which is actually operated by a player (a specific position indicated by a player's finger) on the image display section 3. In this case, the operation position detecting circuit 60 serves to derive angle information of the detected object, based upon the sensed position input from a respective one of the four cameras 22, and thereafter, concretely specify the position of the player's hand indicated on the image display section 3. By employing the four cameras 22, even if the player sitting at a respective one of the stations 5 executes an instructive operation simultaneously, the indicated position can be precisely specified, based upon the sense information that is obtained by a respective one of the cameras.

The CPU 51 also has an identification processing function of identifying whether or not a player's operation matches positional information which is obtained by the operation position detecting circuit 61, based upon the player's operation position information that is obtained by means of the operation position detecting circuit 61 and the player's operation image that is obtained by means of the image processing circuit 40.

Further, the CPU 51 is capable of receiving/transmitting information from/to an external device 100, such as a host computer, via a communication interface 63. In this case, it is deemed that information concerning a time-based operation state in the gaming device, information concerning a payout rate of gaming mediums at a respective one of the stations, and authentication information of players sitting at stations are transmitted to an external device 100. Further, it is also deemed that reference image data such as facial information of players, who are present in gaming facility or ID information of cards owned by the players, for example, is transmitted from the external device.

Figure 7:
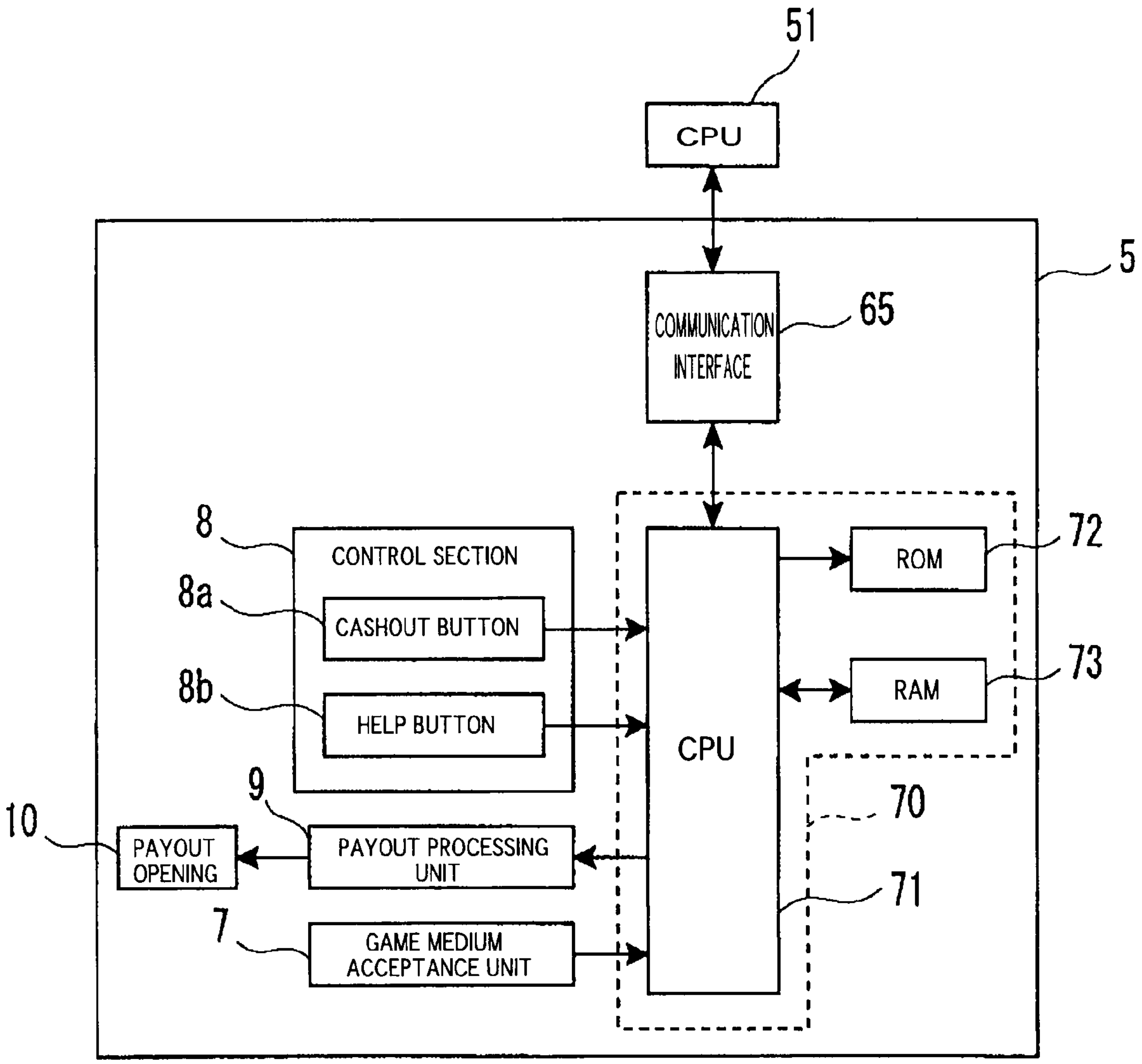
FIG. 7 is a block diagram depicting a control system at each station in the gaming device according to the first embodiment.

FIG. 7 is a block diagram depicting a control system at each station in the gaming device according to the first embodiment. As shown in the figure, the station 5 is provided with: a player control section 70, which controls an operation at that station; and the peripheral devices mentioned above (such as game medium acceptance unit 7, control section 8, and payout processing unit 9).

The player control section 70 is provided with: a CPU 71 for station control; a ROM 72; and a RAM 73, and receives/transmits data from/to the CPU 51 for main control, of the abovementioned game control section 15A, via a communication interface 65.

The ROM 72 is made up of a semiconductor memory, for example, and stores a program for achieving a basic function at the station 5, a variety of programs that are required to exercise control at other stations, and a data table.

The RAM 73 is a memory which temporarily stores a variety of data which is computed by means of the CPU 71, the amount of credit that is currently owned by a player, and the state of the player-betted chips.

Further, a CASHOUT button 8*a* and a HELP button 8*b*, which are provided at a control section 8 (see FIG. 1), are connected to the CPU 71, and the CPU 71 exercises control to execute a variety of operations corresponding thereto, based upon an operational signal which is output by pressing a respective one of these buttons. After that, an input signal produced by a player operation is transmitted to the CPU 51 for main control.

A payout processing unit 9 is connected to the CPU 71, and allows gaming mediums such as medals to be paid out through a payout opening 10 by means of a payout instruction signal which is derived from the CPU 71. Further, the abovementioned gaming medium acceptance unit 7 that is adapted to enter gaming mediums, such as bills or medals, is connected to the CPU 71. The gaming value information (credit information) that is transmitted from the gaming medium acceptance unit 7 is stored in a RAM 73.

As has been described above, the gaming device 1 at which the CCD camera 31 has been arranged as an image acquisition section judges whether or not an actual BET operation of an operator (or a player) has been correctly made at a respective one of the stations. This judgment is possible based upon the operation position information that is derived from the operation position detecting circuit 61 and the player image information that is derived from the image processing circuit 40 (specifically, BET operation image information that is derived from the CCD camera 31). Such judgment process is executed in the CPU 51 for main control, of the game control section 15A. In other words, the CPU 51 serves to judge whether or not the BET operation of a respective one of the stations has been correctly executed by the player who is present at the corresponding station. In other words, this CPU serves as an operation mistake detecting section which detects a BET operation mistaken by the player.

Figure 8:
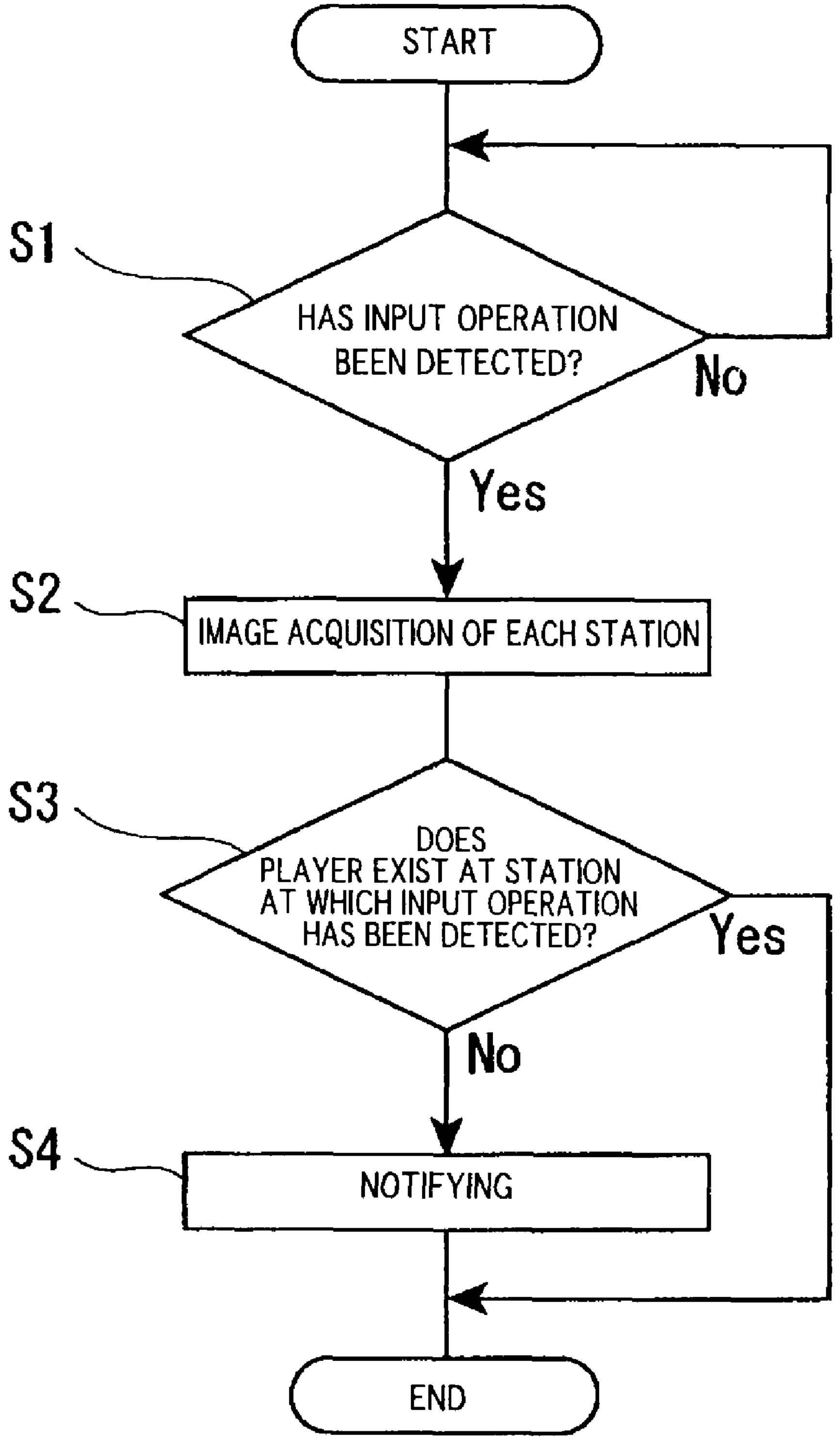
FIG. 8 is a flowchart showing an operating procedure for detecting/judging an input operation at a station at which no player is present, in the gaming device according to the first embodiment.

FIG. 8 is a flowchart showing an operating procedure for detecting/judging an input operation at a station where no player is present at the gaming device according to the first embodiment. Hereinafter, such operating procedure executed at the CPU 51 will be described referring to the flowchart of FIG. 8.

Figure 9:
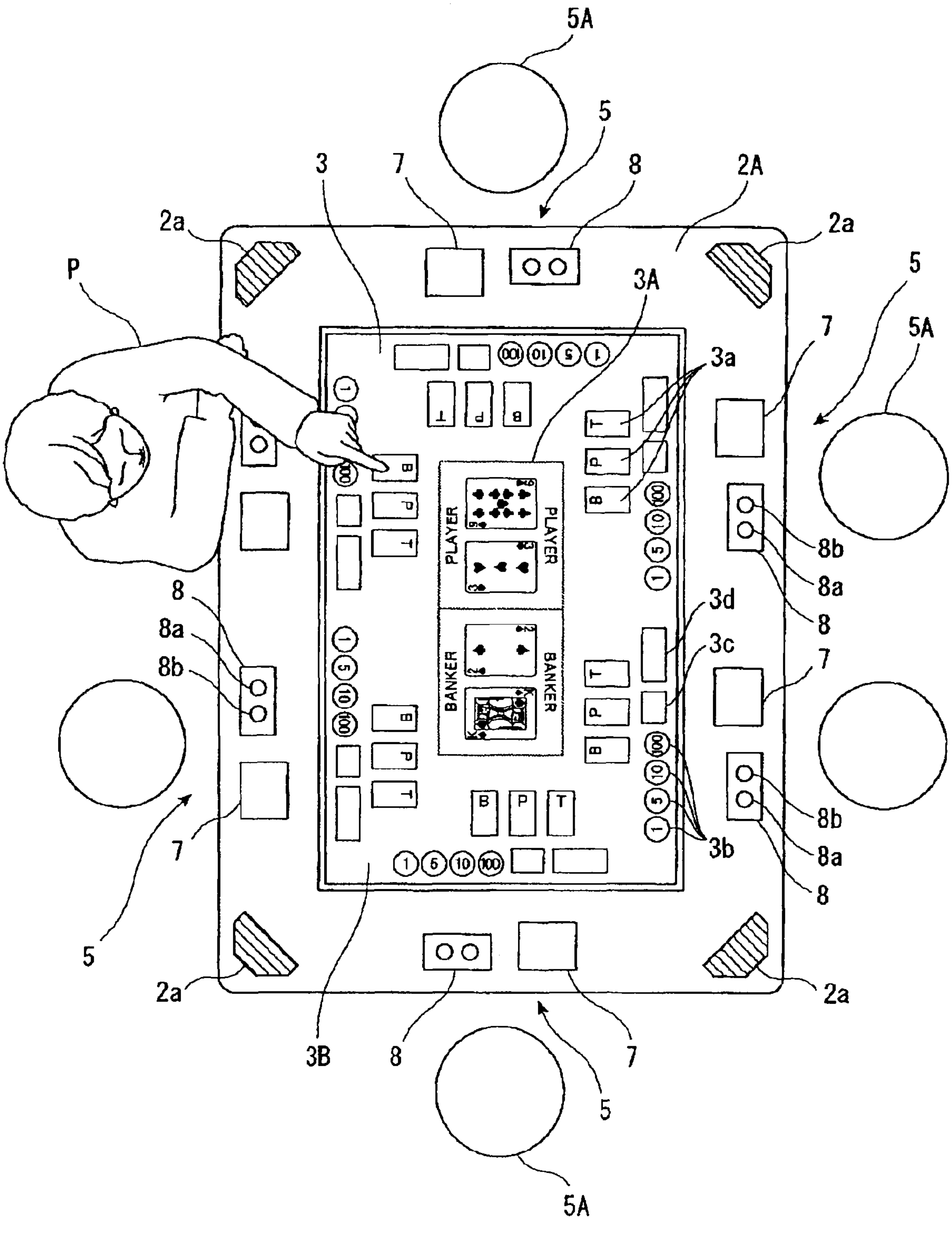
FIG. 9 is a view showing a state of operation of a player, which is image-acquired by means of a CCD camera in the gaming device according to the first embodiment.

FIG. 9 is a view showing a state of an operation of the player, which is image-acquired by means of the CCD camera in the gaming device according to the first embodiment. First, the CPU 51 detects whether or not an input operation is made at any of the stations 5 (step S1). Such input operation detection can be performed based upon an operational input signal including operation position information which is derived from the operation position detecting circuit 61 and input operation information which is derived from a respective one of the stations 5. When no input operation is detected at step S1 (when the judgment result at step S1 is NO), the subsequent input operation detection is waited for. When the input operation has been detected at step S1 (when the judgment result at step S1 is YES), the CPU 51 then acquires image information of a respective one of the stations 5 (step S2). This image information can be acquired from the player's image information derived from an image processing circuit 40 (the information derived from the player information processing section 42; the data acquired by the CCD camera 31). As shown in FIG. 9, for example, the acquired image represents a state in which the player P sitting at one of the stations operates a BET area 3*a* on a BET screen. Such image data may be image data itself acquired by means of the CCD camera 31 or may be those obtained by superimposing the game image data and BET image data actually displayed at the image display section 3 after a masking process has been applied to the image data that is acquired by means of the CCD camera 31, as described above.

Subsequently, the CPU 51 judges whether or not a player is present at station 5 where an input operation has been detected (step S3). When this judgment result is YES, it is recognized that the input operation at that station is legitimate, and the input operation is then accepted. On the other hand, when the judgment result at step S3 is NO, i.e., when an operational input of a game is detected at the station where no player is present, the CPU 51 recognizes, as illegal act or an incorrect action (operation mistake), a mysterious phenomenon that an operational input is detected in spite of the absence of the player; notifies the fact (at step S4); and invalidates an input operation of the corresponding station. The notification may be performed in the form of voice or visual display by means of a speaker or a lamp as a notifying means constituting an external device 100, or alternatively, the relevant information may be transmitted to the external device 100 such as a host computer.

Figure 10:
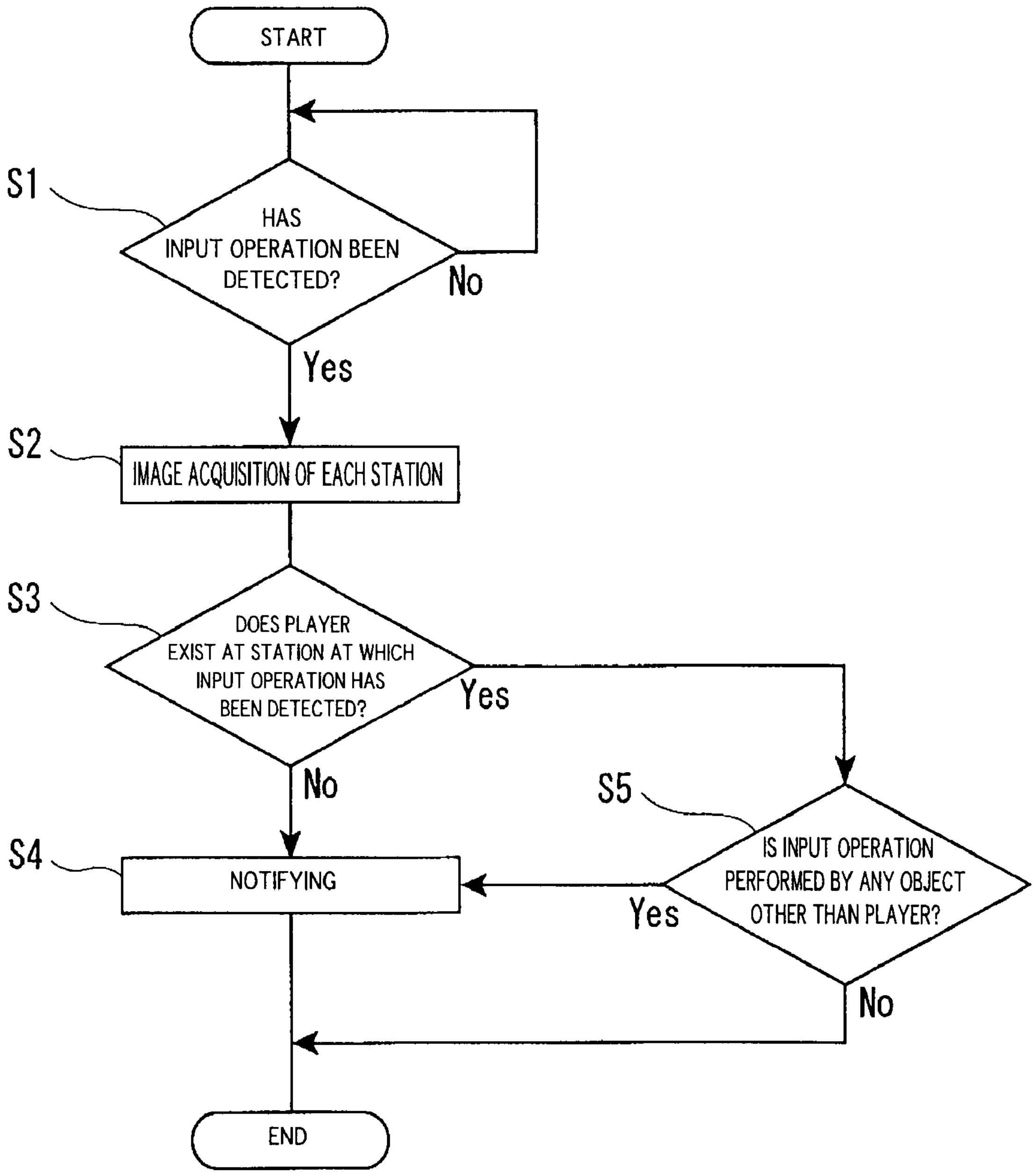
FIG. 10 is a flowchart showing another operating procedure for detecting/judging an input operation at a station in accordance with the presence or absence of a player in the gaming device according to the first embodiment.

FIG. 10 is a flowchart showing another operating procedure for detecting/judging an input operation at a station according to the presence or absence of the player at the gaming device according to the first embodiment. The figure, i.e., FIG. 10, also shows a modification of the operational procedure of FIG. 8. The operating procedure according to this modification is merely different from that of FIG. 8 in processing after YES has been judged at step S3 of FIG. 8, and other steps are identical to those of FIG. 8. Specifically, in the process of FIG. 10, the CPU 51 judges whether or not a player is present at station 5 where an input operation has been detected after the steps S1 and S2 identical to those of FIG. 8 have been executed (step S3). When the judgment result is YES, it is then judged whether or not an input operation is made by an object other than a player, based upon the image information that is derived from the CCD camera 31 (step S5). Cases in which an input operation is made by an object other than the player include a case in which an operational input mistakenly reacts on the player's possession (such as scarf, gloves removed from hands, cigarette, or drinking vessels such as cup or glass), for example. If such a situation takes place (when the judgment result of step S5 is YES), the CPU 51 recognizes it as an incorrect action (operation mistake), and notifies the fact (step S4). In other words, in this modification, even in the case where a player is present at a station, notification is performed under a predetermined condition (incorrect action due to personal possession, in this case).

As has been described above, according to the gaming device 1 of the embodiment, where the presence or absence of a player is verified by a live image of station 5 using an image acquisition means 30 and an operational input is detected at station 5 at which no player is present, the fact can be notified. In other words, a mysterious phenomenon that an operational input is detected in spite of the absence of a player can be recognized and notified as an illegal act or an incorrect action (operation mistake). Thus, under an unattended game-playing environment in which a person monitoring a game is not present, or alternatively, even under a game-playing environment that it is difficult to check operation of all of the players, although a dealer or a person monitoring a game is present, a game-playing situation and an incorrect action (operation mistake) or illegal act in the game can be grasped visually, reliably, and precisely.

In the gaming device according to the present invention, for example, objects for specifying an operation position can be appropriately modified. For example, the objects may be constituent elements for specifying a position of an operational object possessed by a player. While the image display section 3 was constituted to project a game image by means of a projector installed inside of the cabinet 2, this display section may be made up of a liquid crystal display or the like. Further, the constituent elements or operating equipment employed at station 5 at which a game is to be performed can be appropriately modified according to the game to be performed.

2. Second Embodiment

Hereinafter, a gaming device according to a second embodiment will be described referring to FIGS. 11 to 18. The gaming device according to the second embodiment will be explained as modification of the gaming device according to the first embodiment. Like constituent elements are designated by like reference numerals, and a duplicate description thereof is omitted.

Figure 11:
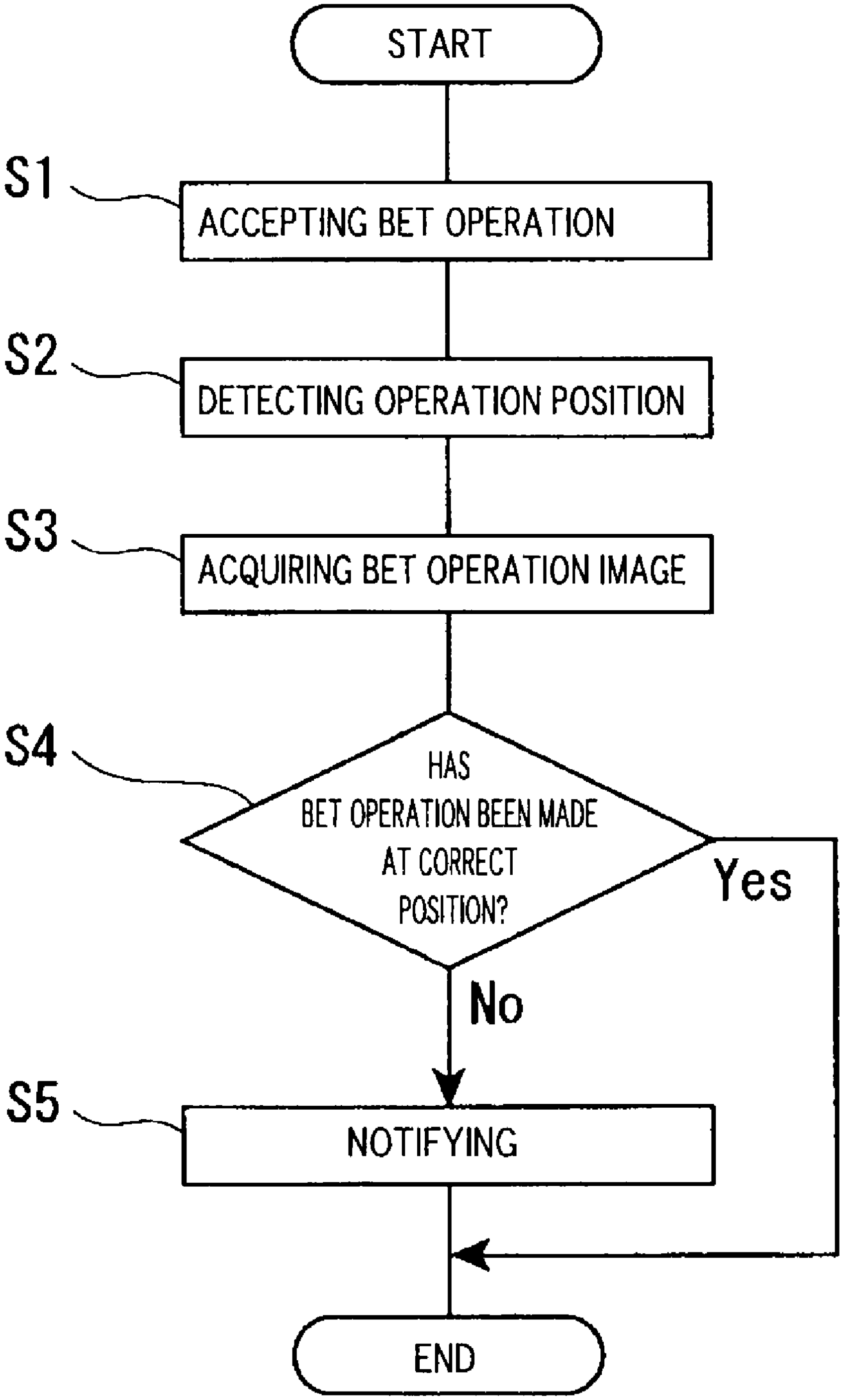
FIG. 11 is a flowchart showing a first example of an operation mistake detecting process executed by means of a CPU in a gaming device according to a second embodiment.
Figure 16:
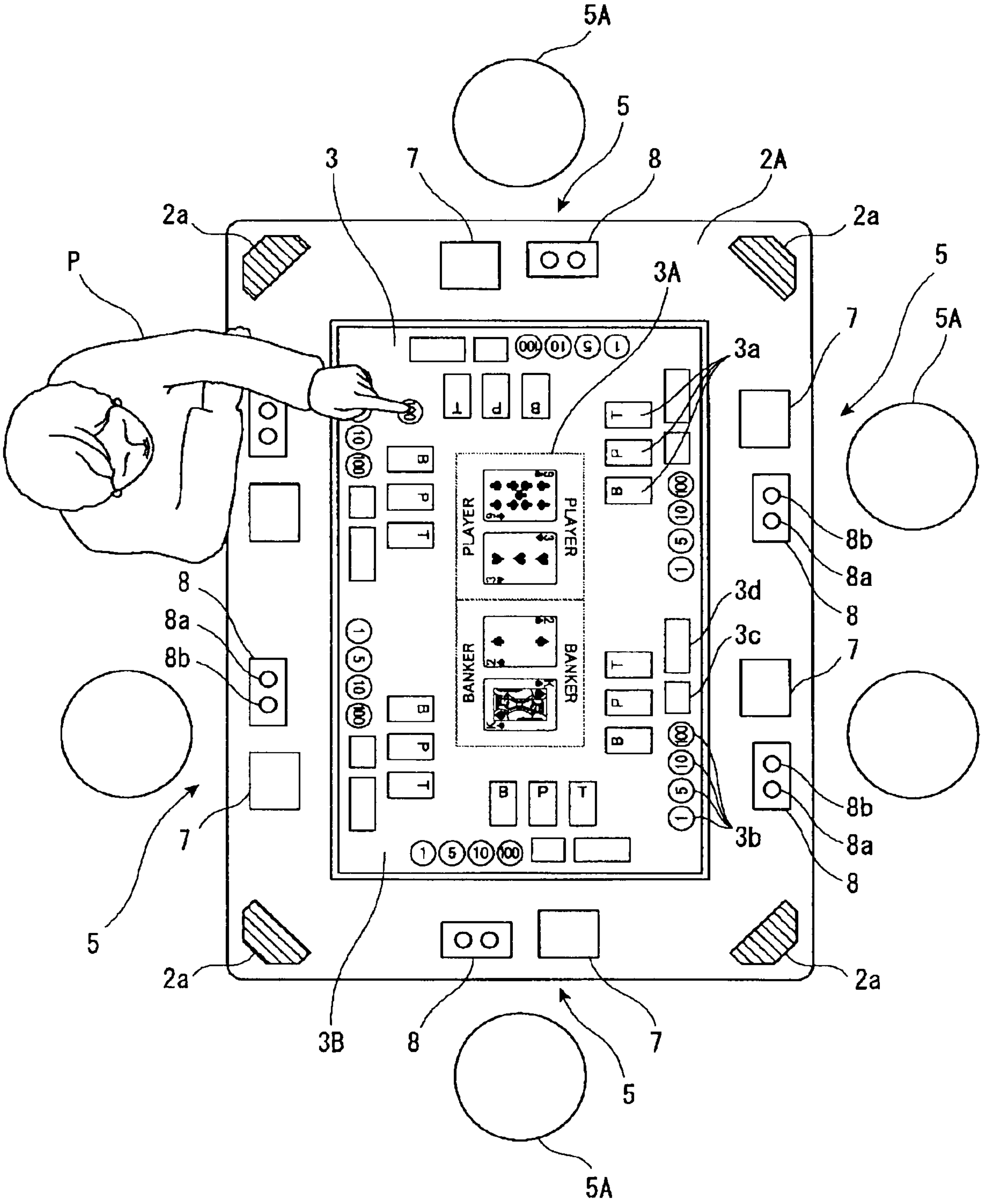
FIG. 16 is a view showing a state of operation of the player, which is acquired by means of the CCD camera in the gaming device according to the second embodiment, the view showing a state in which a player places a gaming medium at an incorrect BET operation position.

FIG. 11 is a flowchart showing a first example of an operation mistake detecting process executed at a CPU in the gaming device according to the second embodiment. FIG. 16 is a view showing a state of operation of the player, which is acquired by means of the CCD camera in the gaming device according to the second embodiment, the view showing a state in which a player places a gaming medium at an incorrect BET operation position. Hereinafter, the procedure for detecting an operation mistake, which is executed at a CPU 51, will be described referring to the flowchart of FIG. 11.

First, concurrently with starting a game, an acceptance process, such as displaying a BET operation image for a respective one of the stations 5, is performed (step S1). The BET operation made by a player is sensed by means of a sensor unit 20, and the operation position is detected at an operation position detecting circuit 61 (step S2). At this step, it is presumed that the BET operation is made at a station corresponding to the detected operation position.

Next, a player BET operation image upon detecting an operation position is acquired from image data acquired by means of the CCD camera 31 (step S3). The acquired image represents a state in which a player P sitting at a certain station makes operation on a BET screen, as shown in FIG. 16. Such image data may be image data itself acquired by means of the CCD camera 31, or alternatively, may be those obtained by superimposing the game image data and BET image data actually displayed at the image display section 3 after a masking process has been applied to the image data acquired by means of the CCD camera 31, as described above.

Subsequently, the CPU 51 judges whether or not the player has made BET operation, based upon the acquired BET operation image (step S4). When it is judged that the player P sitting at a certain station, as shown in FIG. 16, makes mistaken operation such that a gaming medium is betted off of a BET area 3*a* in a BET screen (i.e., such that no gaming mediums are betted at a correct BET position) by means of the acquired image, i.e., when the judgment result at step S4 is NO, the fact is notified to the player (step S5) and the BET processing operation at the station is invalidated. On the other hand, when the judgment result at step S4 is YES, the BET operation is accepted, and a game is continued as is. The notification may be performed in the form of voice or visual display by means of a speaker or a lamp as a notifying section constituting an external device 100, or alternatively, the relevant information may be transmitted to the external device 100 such as a host computer.

Figure 12:
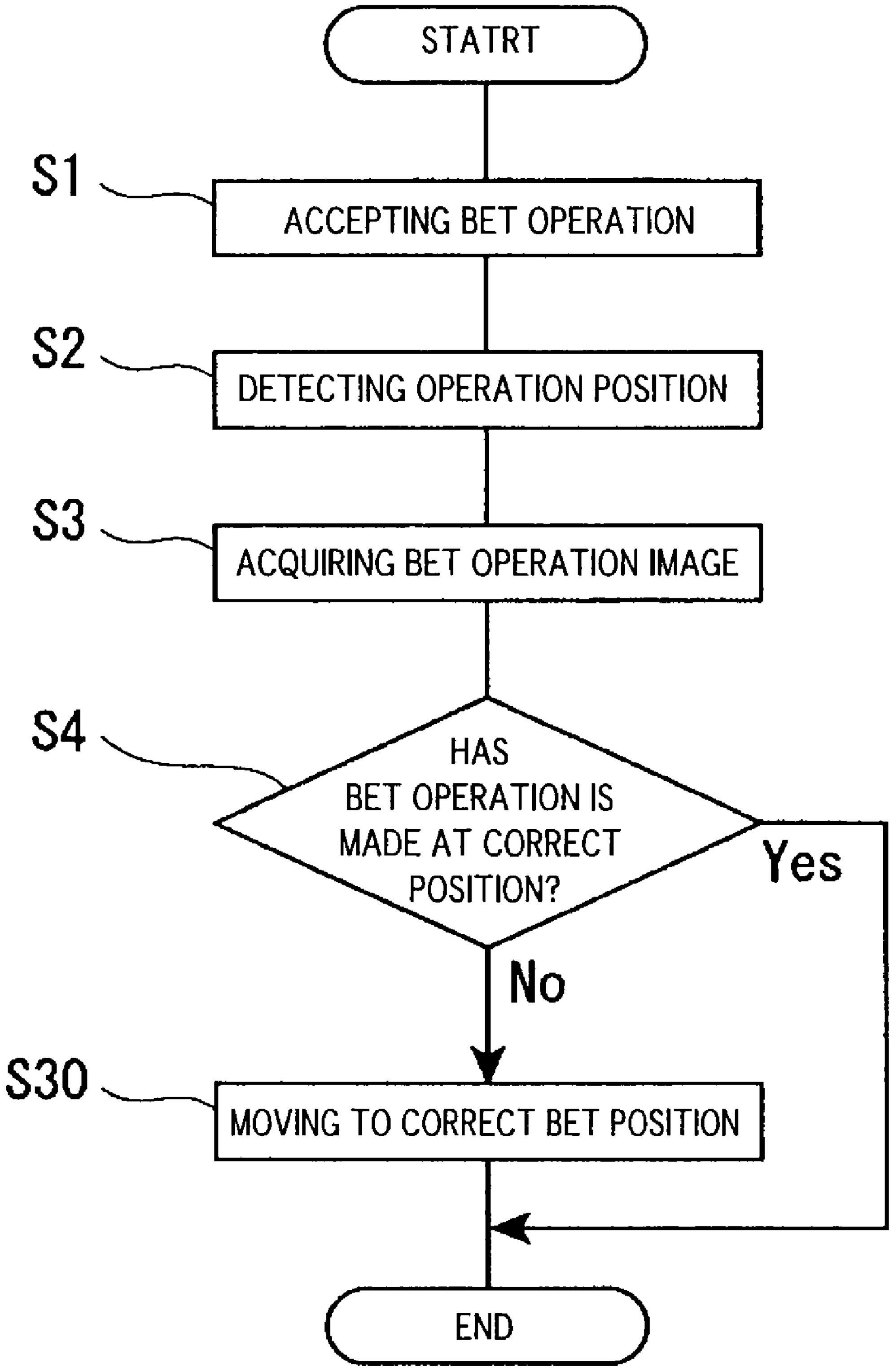
FIG. 12 is a flowchart showing a second example of the operation mistake detecting process executed by means of the CPU in the gaming device according to the second embodiment.
Figure 17:
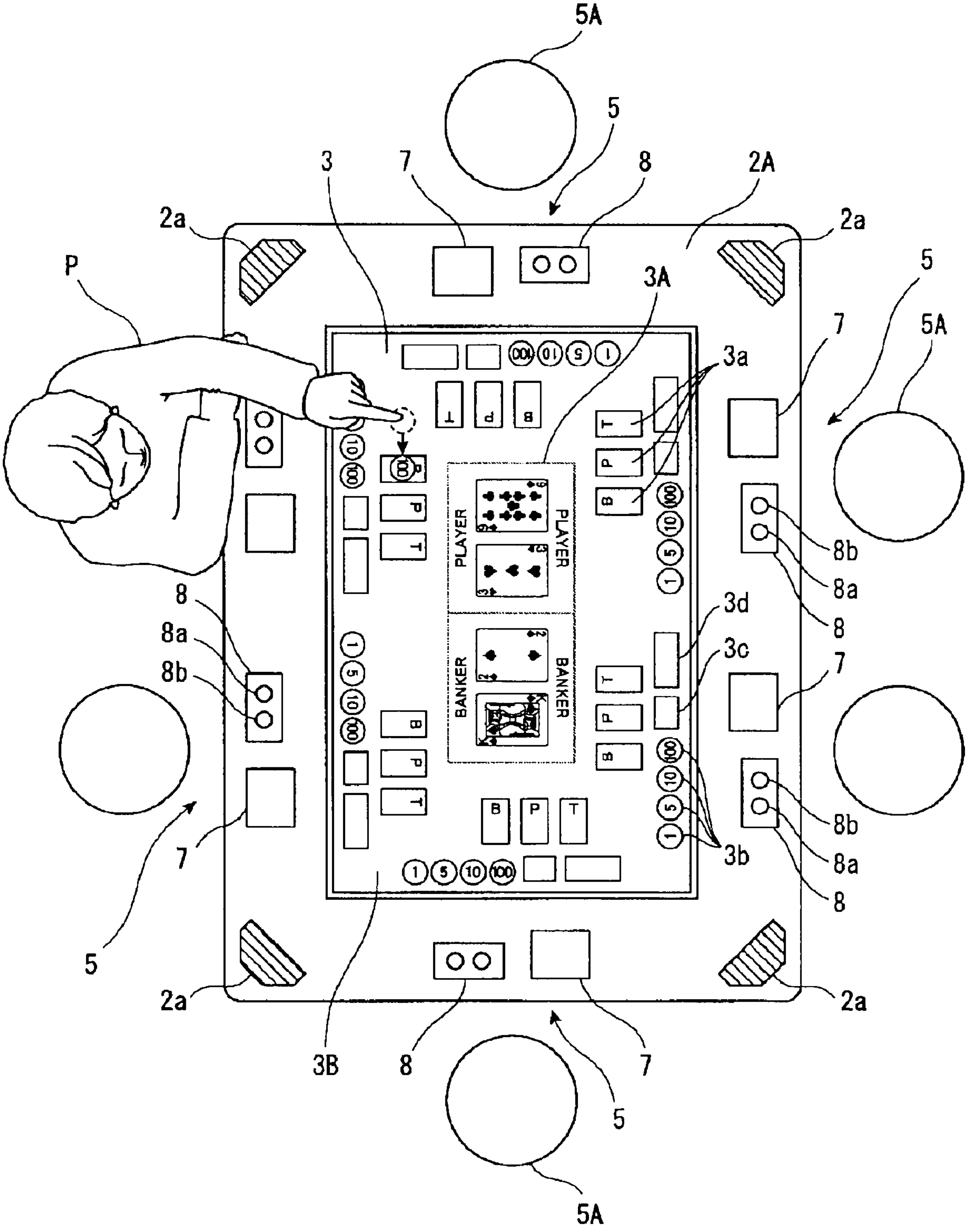
FIG. 17 is a view showing a state of operation of a player, which is acquired by means of the CCD camera in the gaming device according to the second embodiment, the view showing a state in which the incorrectly placed gaming medium is automatically moved to a correct BET position.

FIG. 12 is a flowchart showing a second example of the operation mistake detecting process executed at the CPU in the gaming device according to the second embodiment. FIG. 17 is a view showing a state of operation of a player, which is acquired by means of the CCD camera in the gaming device according to the second embodiment, the view showing a state in which the incorrectly placed gaming medium is automatically moved to a correct BET position. In this process, after the steps S1 to S3 have been executed in association with the procedure shown in FIG. 11, the CPU 51 judges whether or not a player has made BET operation at a correct position, based upon the acquired BET-operation image at step 4. When it is judged that the player P sitting at a certain station, as shown in FIG. 16, makes a mistaken operation such that a gaming medium is betted off of the BET area 3*a* in the BET screen (in other words, such that no gaming mediums are betted at the correct BET position) by means of the acquired image, i.e., when the judgment result at step S4 is NO, a gaming medium, which is betted off of the BET area 3*a*, is automatically moved to a correct BET position (the nearest BET position, for example), as shown in FIG. 17 (step S30). Alternatively, if a correct position cannot be judged, the gaming medium is automatically returned to its original chip display area 3*b*. In this sense, the CPU 51 serves as an automatic correction section for automatically correcting a BET operation mistaken by the player. On the other hand, when the judgment at step S4 is YES, the BET operation is accepted, and a game is then continued as is.

Figure 13:
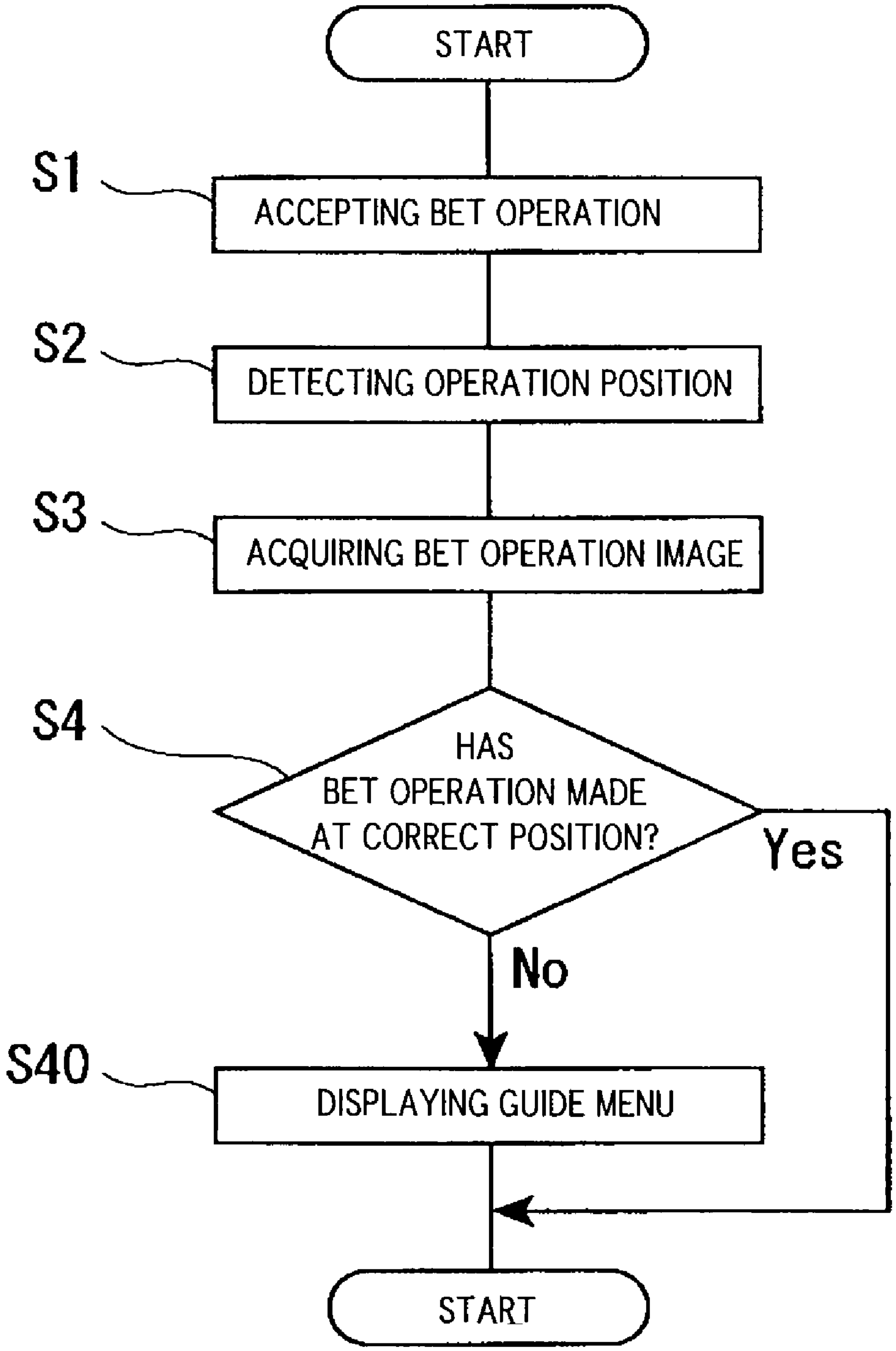
FIG. 13 is a flowchart showing a third example of the operation mistake detecting process executed by means of the CPU in the gaming device according to the second embodiment.

FIG. 13 is a flowchart showing a third example of an operation mistake detecting process executed at the CPU in the gaming device according to the second embodiment. In this process, after the steps S1 to S3 have been executed in association with the procedure shown in FIG. 11, the CPU 51 judges, at step 4, whether or not the player has made BET operation at a correct position, based upon the acquired BET operation image. When it is judged that the player P sitting at a certain station, as shown in FIG. 16, makes a mistaken operation such that a gaming medium is betted off of the BET area 3*a* in the BET screen (i.e., such that no gaming mediums are betted at the correct BET position) by means of the acquired image, i.e., when the judgment result at step S4 is NO, a guide menu for providing a variety of options to the player is displayed on an operational screen, for example, via an image control drive circuit 60 (step S40). Such guide menu may contain an item description of inquiring a correct BET position to be betted by the player, or alternatively, may contain an item description of promoting the player to retry BET operation. In this sense, the CPU 51 serves as an option providing section which provides to the player an option for correcting a BET operation mistaken by the player. On the other hand, when the judgment result at step S4 is YES, the BET operation is accepted, and a game is then continued as is.

Figure 14:
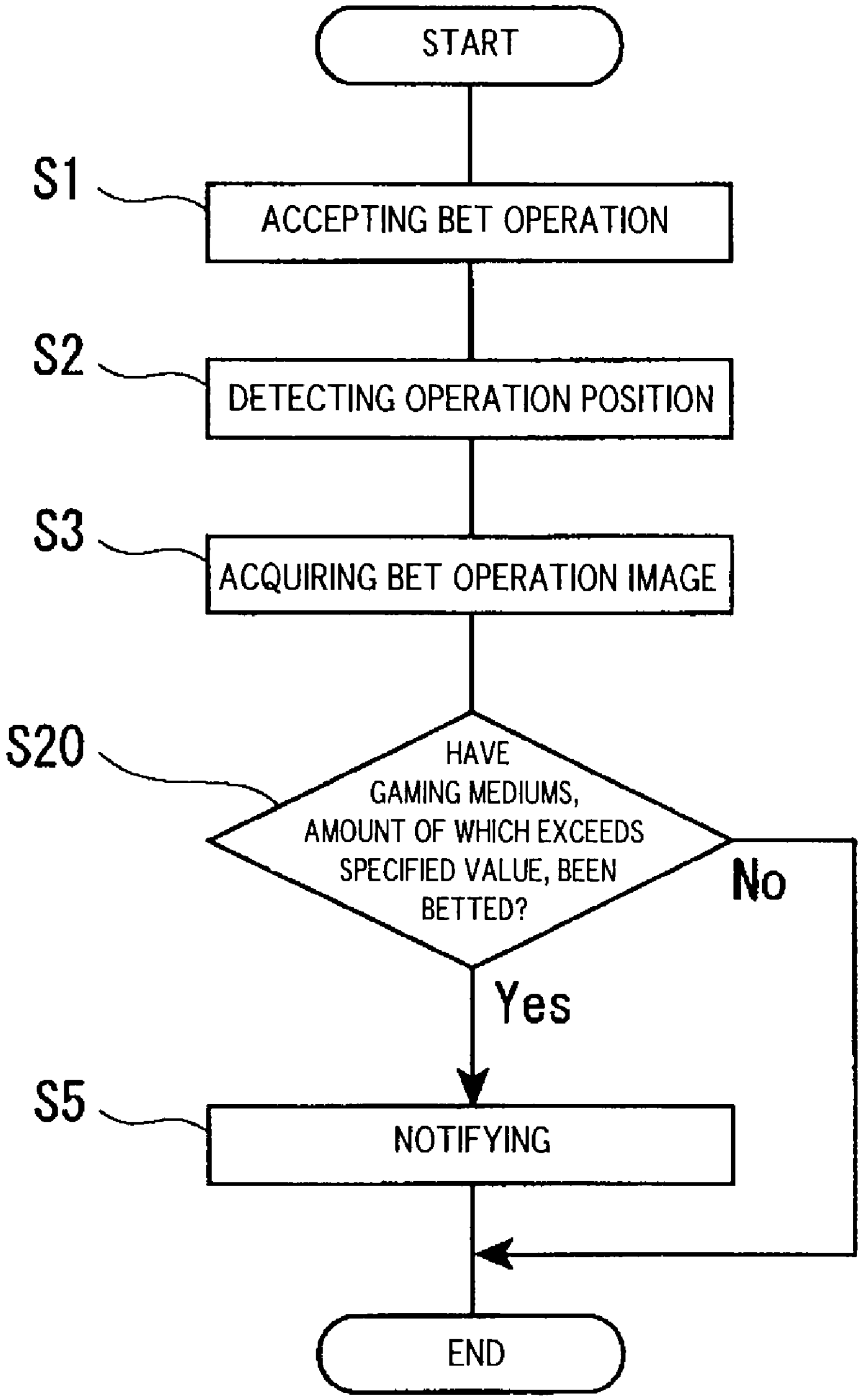
FIG. 14 is a flowchart showing a fourth example of the operation mistake detecting process executed by means of the CPU in the gaming device according to the second embodiment.
Figure 18:
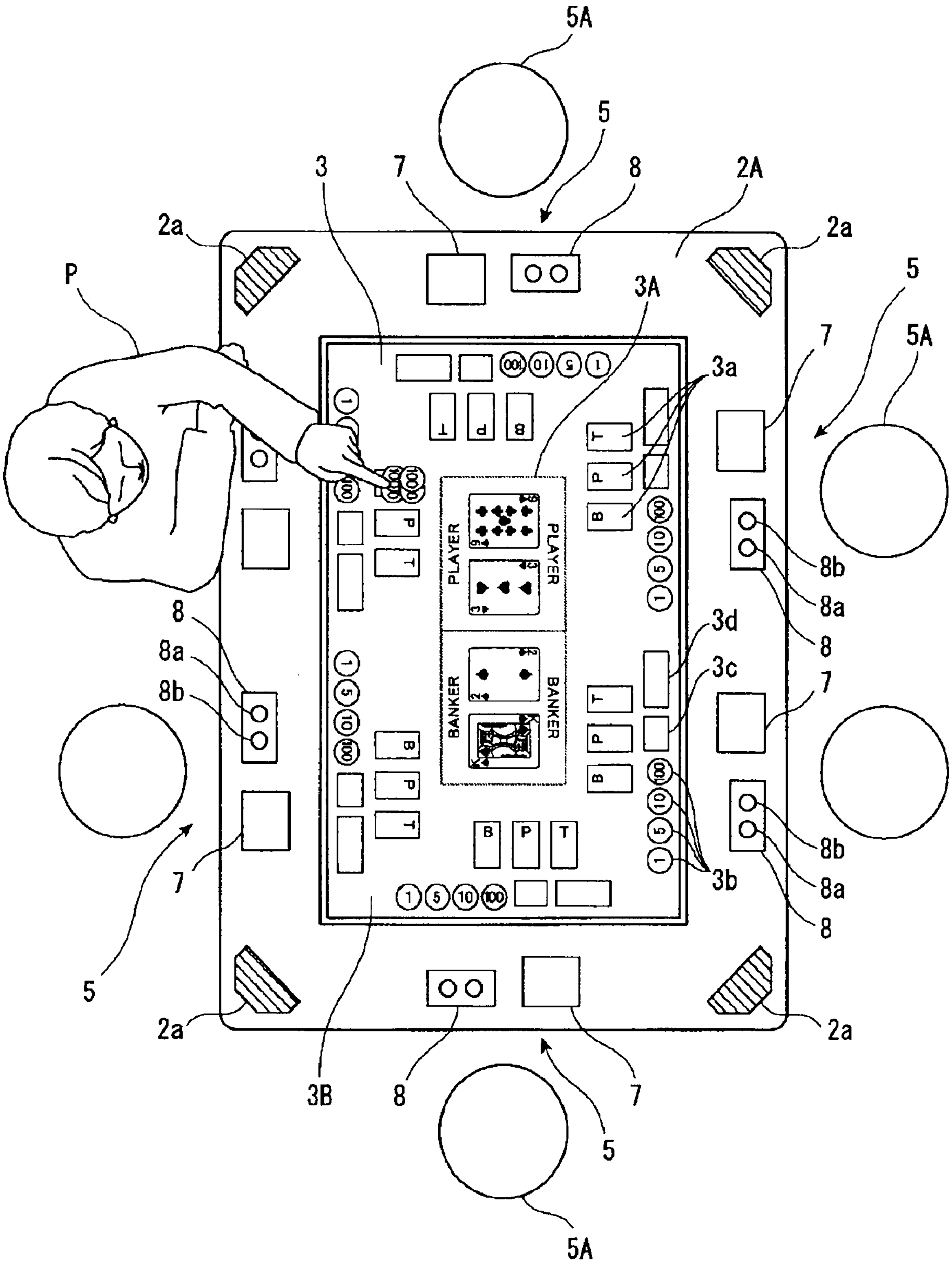
FIG. 18 is a view showing a state of operation of a player, which is acquired by means of the CCD camera in the gaming device according to the second embodiment, the view showing a state in which a player places gaming mediums exceeding a specified amount is a BET operation position.

FIG. 14 is a flowchart showing a fourth example of the operation mistake detecting process executed at the CPU in the gaming device according to the second embodiment. FIG. 18 is a view showing a state of operation of a player, which is acquired by means of the CCD camera in the gaming device according to the second embodiment, the view showing a state in which a player places gaming mediums exceeding a specified amount is a BET operation position. In this process, after the steps S1 to S3 have been executed in association with the procedure shown in FIG. 11, the CPU 51 judges, at step S20, whether or not gaming mediums, the amount of which exceeds a specified value, have been betted at a BET position, based upon the acquired BET operation image. As shown on FIG. 18, when it is judged that the player P sitting at a certain station has betted gaming mediums, the amount of which exceeds a specified value, in the BET area 3*a* of the BET screen, i.e., when the judgment result at step S20 is YES, the fact is notified to the player (step S5) and the BET processing operation at the station is invalidated. On the other hand, when the judgment result at step S20 is NO, the BET operation is accepted, and a game is then continued as is. The notification may be performed in the form of voice or visual display by means of a speaker or a lamp as a notifying means constituting an external device 100, or alternatively, the relevant information may be transmitted to the external device 100 such as a host computer.

Figure 15:
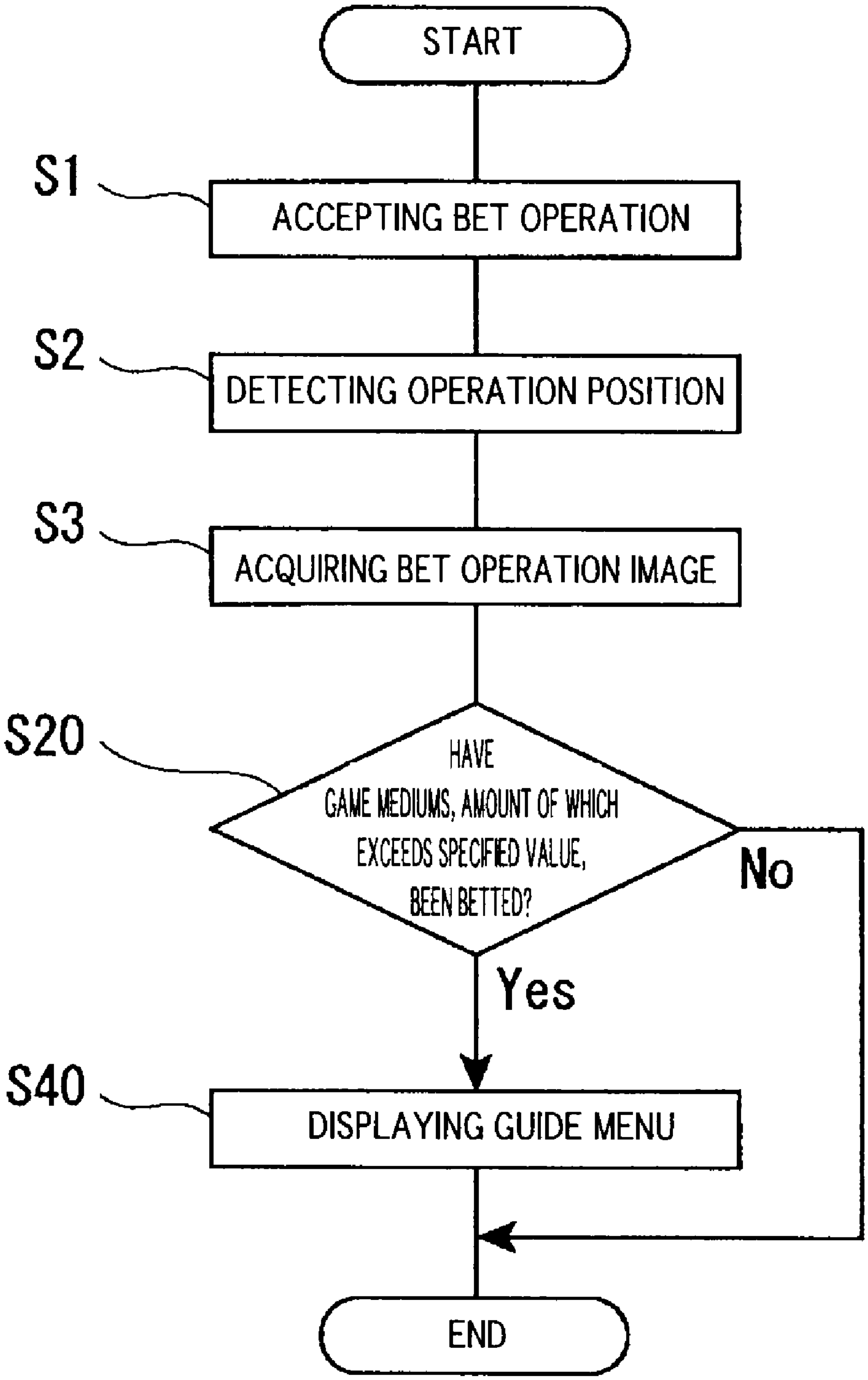
FIG. 15 is a flowchart showing a fifth example of the operation mistake detecting process executed by means of the CPU in the gaming device according to the second embodiment.

FIG. 15 is a flowchart showing a fifth example of the operation mistake detecting process executed at the CPU in the gaming device according to the second embodiment. In this process, after the steps S1 to S3 have been executed in association with the procedure shown in FIG. 11, the CPU 51 judges, at step S20, whether or not gaming mediums, the amount of which exceeds a specified value, have been betted at a BET position, based upon the acquired BET operation image. When it is judged that the player P sitting at a certain station, as shown in FIG. 18, makes a mistaken operation such that a gaming medium is betted off of the BET area 3*a* in the BET screen (i.e., such that no gaming mediums are betted at the correct BET position) by means of the acquired image, i.e., when the judgment result at step S20 is NO, a guide menu for providing a variety of options to the player is displayed on an operational screen, for example, via an image control drive circuit 60 (step S40). Such guide menu may contain an item description of inquiring a correct BET position to be betted by the player or may contain an item description of promoting the player to retry BET operation. When the judgment result at step S20 is NO, the BET operation is accepted, and a game is then continued as is.

As has been described above, according to the gaming device 1 of the embodiment, the BET operation mistaken by a player is detected, based upon an image derived from an image acquisition section 30 which image-acquires a player. For this reason, the mistaken operation can be detected visually, reliably, and efficiently, and the fact is notified to the player, based upon the detection of the operation mistake (see FIGS. 11 and 14). Therefore, the player is given an opportunity of correcting the mistaken BET operation, which is very beneficial thereto. This leads to enhancing the player's reliability relative to the gaming device.

According to the gaming device 1 of the embodiment, BET operation mistaken by the player is automatically corrected (see FIG. 12), and therefore, retrying of the player operation can be eliminated, which is beneficial to the player.

According to the gaming device 1 of the embodiment, the player is given an option for correcting a mistaken BET operation (see FIGS. 14 and 15), thus allowing the player to cope with a variety of operation mistakes.

While the gaming device according to the present invention has been described hereinbefore, the present invention can be variously modified without being limitative to the abovementioned embodiments.

The configuration of the gaming device or the objects for specifying operation positions, for example, can be appropriately modified. For example, a constituent element for specifying the position of an operation object which the player possesses may be employed without being limitative to the player's hand. While the image display section 3 was constituted to project a game image by means of the projector installed inside of the cabinet 2, this display section may be made up of a liquid crystal screen or the like. Further, the constituent elements or operating equipment employed at station 5 at which a game is to be performed can be appropriately modified according to the game to be performed.

What is claimed is:

1. A gaming device, comprising:

(a) a plurality of stations which can be played by respective ones of a plurality of players;

(b) a display section which displays an image for a game and a BET image corresponding to a respective one of the stations;

(c) a detection section which detects a motion of the player when the player who is present at a respective one of the stations makes a BET operation for the BET image displayed at the display section;

(d) an image acquisition section which is capable of acquiring an image of the player who is present at the respective one of the stations;

(e) a notification section which performs notification, based upon a predetermined condition; and (f) a controller which can be communicated with the plurality of stations, the controller being configured to:

(i) receive acceptance information of a game from the plurality of stations;

(ii) cause the display section to display the BET image corresponding to the respective one of the stations;

(iii) perform a first judgment process of judging a movement of a player's hand at a time of making a BET operation of at least one gaming medium for a BET image that is displayed on the display section by sensing the player's hand from a back side of the display section by employing a sensor unit of the detection section that is provided inside the display section, and then, judging a state of the BET operation of the player;

(iv) perform a second judgment process of acquiring an image of the player who is present at the respective one of the stations, processing the acquired image information as an image, and then, judging a play state of the player, with referring to the information that is obtained by the image processing and reference information that is stored in advance;

(v) perform a third judgment process of judging whether or not the notification section notifies that there is an illegal act or a mistaken operation, based upon a result of the first judgment process of judging the BET operation state of the player in the process (iii) and result of the second judgement process of judging the play state of the player in the process (iv); and (vi) cause the notification section to perform notification in accordance with a judgment result of the third judgment in the process (v).

2. A gaming device, comprising:

a cabinet having stations which can be played by a plurality of players and are installed by the players;

an image display section which is provided at the cabinet and displays an image for a game and a BET image corresponding to a respective one of the stations;

an image control section having image data for the game displayed at the image display section and image data for BET operation, for controlling the image displayed at the image display section;

a motion detection section which detects a motion when the player who is present at a respective one of the stations makes BET operation for the BET image displayed at the image display section;

an image acquisition section which is installed at the cabinet and is configured to acquire an image of the player who is present at the respective one of the stations;

a player detection section which detects whether the player is present at the respective one of the stations, based upon a video image acquired by the image acquisition section;

an input operation detecting section which detects an operational input for a game played at the respective one of the stations; and a notification section which provides notification of detection when the operational input of the game at the station is detected by the input operation detecting and it is detected by the player detection section that no player is present, and invalidates the input operation in response thereto.

3. The gaming device according to claim 2, wherein the notification section vocally notifies the detection.

4. The gaming device according to claim 2, wherein the notification section notifies the detection by way of visual display.

5. A gaming device, comprising:

a cabinet having stations which can be played by a plurality of players and which is installed by the players;

an image display section which is provided at the cabinet and displays an image for a game and a BET image corresponding to a respective one of the stations;

an image control section having image data for the game displayed at the image display section and image data for BET operation, for controlling the image displayed at the image display section;

a motion detection section which detects a motion when the player who is present at a respective one of the stations makes BET operation for the BET image displayed at the image display section;

an image acquisition section which is installed at the cabinet and is capable of acquiring an image of the player who is present at the respective one of the stations;

an operation mistake detecting section which detects a mistaken BET operation by a player, based upon the visual image acquired by the image acquisition section; and a notification section which notifies detection of the mistaken BET operation when the mistake is detected by the operation mistake detecting section.

6. The gaming device according to claim 5, wherein, the BET image includes a gaming medium to be bet and a BET position at which the gaming medium is to be bet, and the mistaken BET operation is an operation in which no gaming medium is bet at the BET position.

7. The gaming device according to claim 5, wherein, the BET image includes a gaming medium to be bet and a BET position at which the gaming medium is to be bet, and the mistaken BET operation is an operation in which a gaming medium, an amount of which exceeds a specified value, is bet at the BET position.

8. The gaming device according to claim 5, further comprising:

an automatic correction section configured to automatically correct the mistaken BET operation by the player.

9. The gaming device according to claim 5, further comprising:

an option providing section which provides to a player an option for correcting the mistaken BET operation by the player.

* * * * *